United States Patent
Beckett et al.

(10) Patent No.: US 6,564,368 B1
(45) Date of Patent: May 13, 2003

(54) SYSTEM AND METHOD FOR VISUAL APPLICATION DEVELOPMENT WITHOUT PROGRAMMING

(75) Inventors: Stephen Beckett, Canton, GA (US); Santino Lamberti, Marietta, GA (US); Todd Palmer, Kennesaw, GA (US); Becky Beckett, Canton, GA (US); Henry Yoder, Woodstock, GA (US); Ray Donnelly, Acworth, GA (US); Danny McDougald, Acworth, GA (US); Donald House, Acworth, GA (US)

(73) Assignee: Call Center Technology, Inc., Woodstock, GA (US)

(*) Notice: Subject to any disclaimer, the term of this patent is extended or adjusted under 35 U.S.C. 154(b) by 0 days.

(21) Appl. No.: 09/410,993

(22) Filed: Oct. 1, 1999

Related U.S. Application Data

(60) Provisional application No. 60/102,649, filed on Oct. 1, 1998.

(51) Int. Cl.[7] ................................................ G06F 9/44
(52) U.S. Cl. .................. 717/113; 717/102; 717/104; 717/105; 717/109; 717/110; 717/115; 717/116; 717/125
(58) Field of Search ................................. 717/113, 101, 717/102, 104, 105, 106–109, 110, 111, 112, 116, 120, 121, 124, 125, 115

(56) References Cited

U.S. PATENT DOCUMENTS

| | | | | |
|---|---|---|---|---|
| 5,237,691 A | * | 8/1993 | Robinson et al. ........... 717/107 |
| 5,517,645 A | * | 5/1996 | Stutz et al. .................. 709/100 |
| 5,642,511 A | * | 6/1997 | Chow et al. ................. 345/967 |
| 5,745,712 A | * | 4/1998 | Turpin et al. ............... 345/763 |
| 5,760,788 A | * | 6/1998 | Chainini et al. ............ 345/474 |
| 5,805,896 A | * | 9/1998 | Burgess ...................... 717/166 |
| 5,850,548 A | * | 12/1998 | Williams .................... 345/961 |
| 6,014,138 A | * | 1/2000 | Cain et al. .................. 345/744 |
| 6,016,392 A | * | 1/2000 | Jordan ........................ 709/328 |
| 6,226,787 B1 | * | 5/2001 | Serra et al. ................. 717/125 |
| 6,298,474 B1 | * | 10/2001 | Blowers et al. ............... 700/83 |
| 6,385,769 B1 | * | 5/2002 | Lewallen .................... 717/116 |

FOREIGN PATENT DOCUMENTS

EP     0 603 880 A2 *   6/1994    ............. G06F/9/44

OTHER PUBLICATIONS

Mezini, "Maintaining The Consistency of Class Libraries During Their Evolution", ACM, pp.: 1–21, 1997.*

* cited by examiner

*Primary Examiner*—Gregory Morse
*Assistant Examiner*—Ted T. Vo
(74) *Attorney, Agent, or Firm*—Thomas, Kayden, Horstemeyer & Risley, LLP

(57) ABSTRACT

A method and system for creating distributed applications without programming is disclosed. A Connection Editor interacts with an interface manager attached to each program in the visual development system. The interface manager allows connections to be made using the Connection Editor between the compatible properties of disparate programs by a visual process. Upon connection, the interface manager automates data flow between disparate properties without requiring any additional programming. Furthermore, the interface manager allows for dynamic properties to be exposed based on the run-time discovery of data.

35 Claims, 28 Drawing Sheets

```
IPropertyManager = interface
['{A2B6EFE1-22CE-11D2-A2D3-0060081AEB0C}']
   function    GetComponent:TComponent;
   function    GetProperty(PropName:String):Variant;

function    GetProperties:TPropertyDefs;
   function    GetPropertyCount:Integer;
   function    GetPropertyName(index:Integer):String;

function    GetPropertyDef(index:Integer):TPropertyDef; overload;
   function    GetPropertyDef(name:String):TPropertyDef; overload;

function    GetInputPropertyDef( PropDef:TPropertyDef ):TPropertyDef;
   function    GetOutputPropertyDef( PropDef:TPropertyDef; OutputIndex:Integer
):TPropertyDef;

function    GetInputPropMan( index:Integer ):IPropertyManager; overload;
   function    GetInputPropMan( PropName:String ):IPropertyManager; overload;

function    GetOutputConnectionCount( PropIndex:Integer ):Integer; overload;
   function    GetOutputPropMan( PropIndex:Integer; OutputIndex:Integer
):IPropertyManager; overload;

function    GetOutputConnectionCount( PropName:String ):Integer; overload;
   function    GetOutputPropMan( PropName:String; OutputIndex:Integer
):IPropertyManager; overload;

function    SetInput( PropName:String; PropMan:IPropertyManager;
SourcePropName:String):Boolean; overload;
   function    SetInput( PropName, SourceName, SourcePropName: String ): Boolean;
overload;
   procedure   ClearInput( PropName:String );
   procedure   SetInputs;

function    AddOutput( PropName:String; Target:TObject; TargetName:String
):Boolean;
   function    RemoveOutput( PropName:String; Target:TObject;
TargetName:String):Boolean;

function    AddEvent( PropName:String; Method:TMethod ): Boolean;
   procedure   RemoveEvent( PropName:String; Method:TMethod );

procedure   Connect( PropName:String );
   procedure   Disconnect( PropName:String );
   procedure   ConnectInputs;
   procedure   DisconnectInputs;

{ Component Initialization / Finalization Procedures }
   procedure   cctInitialize( PrismVO:TComponent );
   procedure   cctFinalize;
end;
```

FIG. 4B

Begin putting a set of data into a list box from a query, connect Query to DataSet Select a dynamically exposed column from the DataSet
to expose as a set.

Set (LastNameSet) is dynamically exposed as an output by the DataSet.

Connect the set to the ListBox List input

When the query executes, the list box is populated with the LastName set

Adding a DataPool component.

Defining fields in the data to combine.

Datapool dynamically exposes input data.

Connecting data input components (edit boxes) to the DataPool

SYSTEM AND METHOD FOR VISUAL APPLICATION DEVELOPMENT WITHOUT PROGRAMMING

This application claims the benefit of U.S. Provisional Application No. 60/102,649, filed Oct. 1, 1998 and is herein incorporated by reference.

BACKGROUND OF THE INVENTION

1. Field of the Invention

The present invention relates generally to the field of computers and, more specifically, to a method and system of visually developing distributed applications without programming.

2. Description of the Related Art

Computers as in FIG. 1 are comprised of digital processors that execute instructions to perform tasks. A collection of instructions, or machine code, is referred to as a computer program. Programs can be manifested in a variety of forms, such as but not limited to stand-alone Executables, Libraries, Dynamic Link Libraries, Drivers, Components, Objects, and Distributed Objects.

Programs are created from instructions of a programming language that are accumulated into the program's source code. The source code controls presentation, interfaces, and logic. A programmer authors source-code and compiles it into processor machine code utilizing a compiler compatible with both the source code's language and target processor.

Some programs have an interface that allows other external programs to interact with the program during run-time execution. The interface to Executables, Libraries, and Drivers is typically called an Application Programming Interface or API, while the interface to Components, Objects, and Distributed Objects is simply called an interface. Despite some functional differences, each provides a mechanism for a programmer to interact with a program.

Regardless of the program, its interface will be comprised of one or more of the following primitives: (1) Parameter or Property of a fundamental data type, or (2) Function or Method, which further has an optional list of fundamental data types.

Applications are constructed from one or more programs. Programmers write source code leveraging interfaces that enable disparate programs to interact with each other and provide greater utility.

The process of writing source-code, compiling the source code into machine code, and debugging programs is incredibly costly and difficult. There are very few programmers relative to the general population, and very few highly skilled programmers relative to all programmers. Furthermore, there is little consistency between interfaces of disparate programs causing programmers to face long learning curves when implementing third-party programs in their applications.

To eliminate many of the problems associated with programming, there has been long standing goal in the field of software development to achieve the same level of "componentized" development as in the field of electronic circuit design. In 1968, Doug McIlroy presented a paper on *Mass Produced Software Components*. The following is a quote from this paper: "Follow the lead of hardware design! It is not right that every new development should start from scratch. There should be catalogs of software modules, as there are catalogs of VLSI devices: when we build a new system, we should be ordering components from these catalogs and combining them, rather than reinventing the wheel every time."

To assure interoperability between devices, electronic circuit design industry standards emerged in the form of "Logic Families" such as TTL or CMOS. A logic family defines strict operating parameters such as temperature, frequency, voltage-swing, power, or propagation time. These rules assure devices in the same logic family will work together when connected into a functional design. Standardization of logic families was facilitated in large part because of the limited number of market participants. Unlike in software, a high barrier of entry into the world of electronic device manufacture exists because the expense and expertise to create electronic devices is well beyond what any individual or small company can afford. The result is a few large and well-established companies dominate the market.

Electronic circuits, analogous to software applications, are constructed by connecting existing devices together in an order that provides a useful utility. The cost, efforts, and skill required to construct a circuit in this manner is many orders of magnitude less than that of constructing the actual devices, such as an Intel Pentium Processor™. By isolating the most complex job, such as the construction of a processor, into the domain of a very few highly skilled individuals, the industry is assured the rapid, high-quality construction of products that reuse the efforts of the most skilled engineers.

Unfortunately, there is a very low barrier to entry into the domain of creating computer programs, so no industry standardized logic family that would assure disparate programs could inter-operate without the need for programmers has been established. Thus, application development remains a slow inefficient process dominated by human error and competing standards.

Attempts have been made to solve these problems with the introduction of visually developed executable computers programs; however, many have failed to achieve the level of success as experienced in the electronic paradigm. Highly graphical development environments such as Microsoft's Visual-C++™ or Borland's Delphi™ have facilitated the creation of programs and applications, but at their heart remain programming environments requiring programmers to create and compile source code to do any but the most basic operations.

Visual connection paradigms have been developed to automate data flow between the properties of component frameworks that have metadata and support Run-Time-Type-Information (RTTI) and dynamic invocation, such as COM, or CORBA. A visual development environment may include an interface having a component inspector, component manager, component library, and one or more visual editors. A user can construct a program by selecting one or more components from the library, which displays components in a tabbed palette. Using a visual editor of the system, the user may drill-down into the internals of a component, for modifying its logic. Once the functionality of a component is completed, the user may proceed to connect together various components via the component "ports", which allow access to properties of the component. Components of the system may be nested within other components to an arbitrary level.

Other visual approaches focus on creating named relations between classes in a dynamic object-oriented programming environment via mappers. The mapping objects dynamically bind to the class interfaces of the classes being related. These connections between classes are defined within a visual environment. The relationships can be programmatically attached by name to object instances during program execution. Because these relationships are stored in a resource and are dynamically bound by name to the objects, they can be created and modified without requiring the source code of the objects being associated to be changed. This eliminates hard coded dependencies between objects that impede reuse of the objects in other contexts. This type of program requires meta-data, full dynamic binding and probing support in the objects being connected with the invention.

By operating in a completely generic fashion, these approaches are limited strictly to modern component frameworks, and further are limited to the static metadata, such as Run-Time Type Information (RTTI), of components that cannot alter their behavior based on the run-time discovery of data; this relegates their usefulness to nothing but simple user interfaces. Most importantly, these solutions present numerous user steps to expose connections points between disparate programs and, though graphical and automated, are unable to access and operate dynamic data without programmer intervention.

SUMMARY OF THE INVENTION

The Visual Development System of the present invention offers a common Rapid Application Development environment with the addition of a Visual Data-Flow Model, the Connection Editor. The Connection Editor interacts with the interface manager of all programs in the system to render the real-time status of connections between disparate program interfaces. Applications are constructed by connecting the properties of desired programs using the Connection Editor graphically without any source code programming. The Connection Editor utilizes the interface manager of each program to interrogate available connection points, make and remove connections between programs, and persistently store connection information. During application run-time, programs use their interface manager to initiate and automate data flow between interface properties as required. Changes in any interface property during run-time operation are propagated to all other connected interface properties. Therefore, the present invention permits business logic, data translations, expressions, and other algorithms to be visually modeled using the interface manager and its dynamic properties as well as the Connection Editor. Examples of applications that can be built by the present invention include Call Center Agent Performance Management, Schedule Adherence, and etc.

BRIEF DESCRIPTION OF THE DRAWINGS

FIG. 4B shows the Interface Manager 410 of the preferred embodiment implemented as a Common Object Model (COM) interface.

DETAILED DESCRIPTION

The present invention will now be described more fully with reference to the accompanying drawings, in which a preferred embodiment of the invention is shown. This invention may, however, be embodied in many different forms and should not be construed as limited to the embodiment set forth herein.

United States Provisional Application No. 60/102,649 is hereby incorporated by reference.

The present invention solves the problem of required programmer intervention by eliminating the need entirely by graphically connecting disparate program interfaces while at the same time allowing dynamic properties to be exposed based on the run-time discovery of data. A significant aspect of the invention is the support for dynamic properties that are created in response to the run-time discovery of data. Systems of the prior art have been limited to the construction of user interfaces due to the fact that the interfaces of visual controls are static. The ability to respond to and manipulate dynamic data discovered at run-time allows this invention to construct truly powerful applications that have previously only been possible with programming.

For the purposes of this document, the term "programming" refers to the act of authoring source code and compiling it into machine code. The present invention allows for the construction of applications with a completely visual process that requires no modification or compilation of source code. This document refers to that as non-programmatic development, or development that does not require programming.

Figure 1:
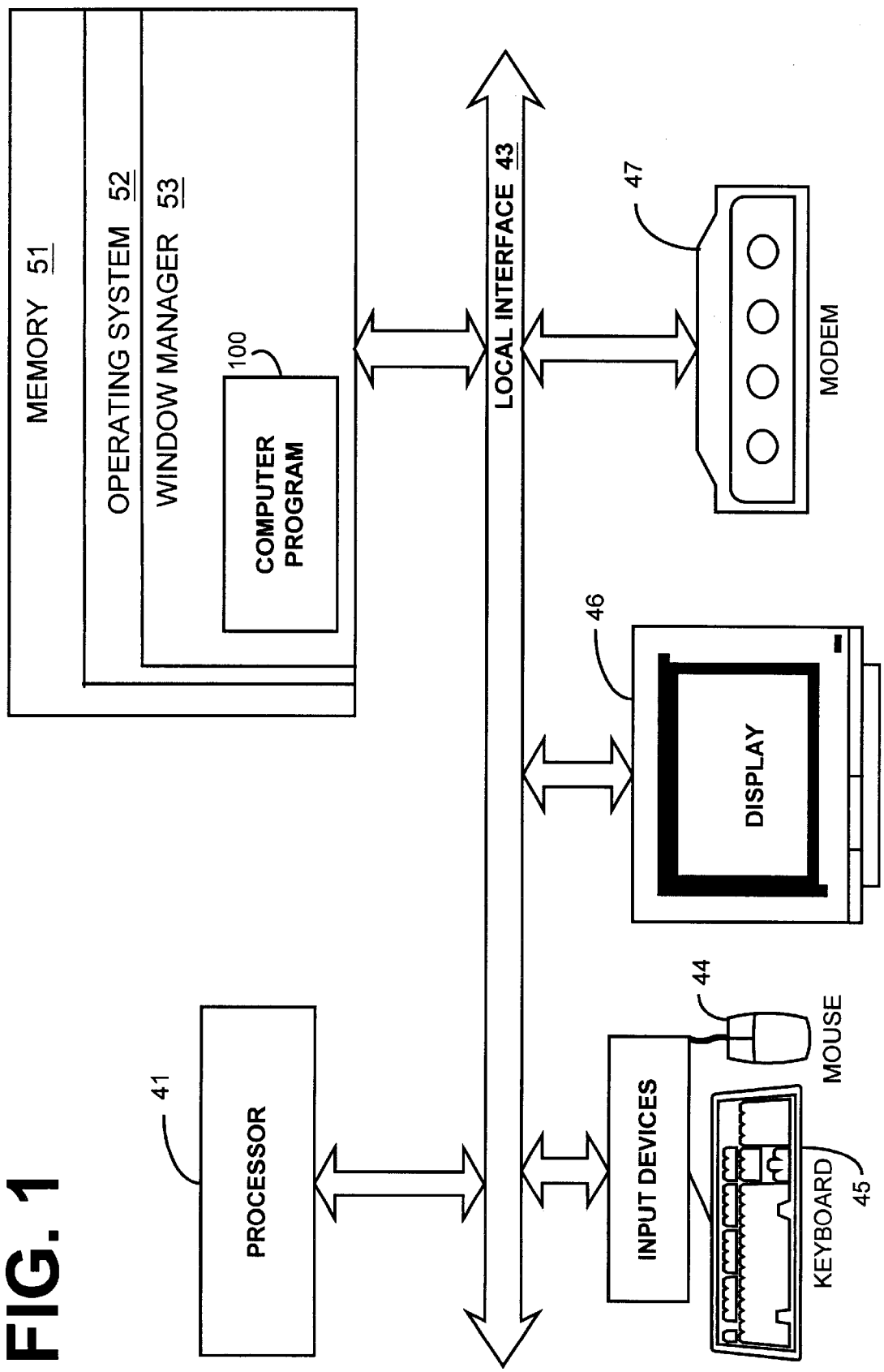
FIG. 1 shows a general-purpose computer and its operating environment in which the present invention is shown.
Figure 2:
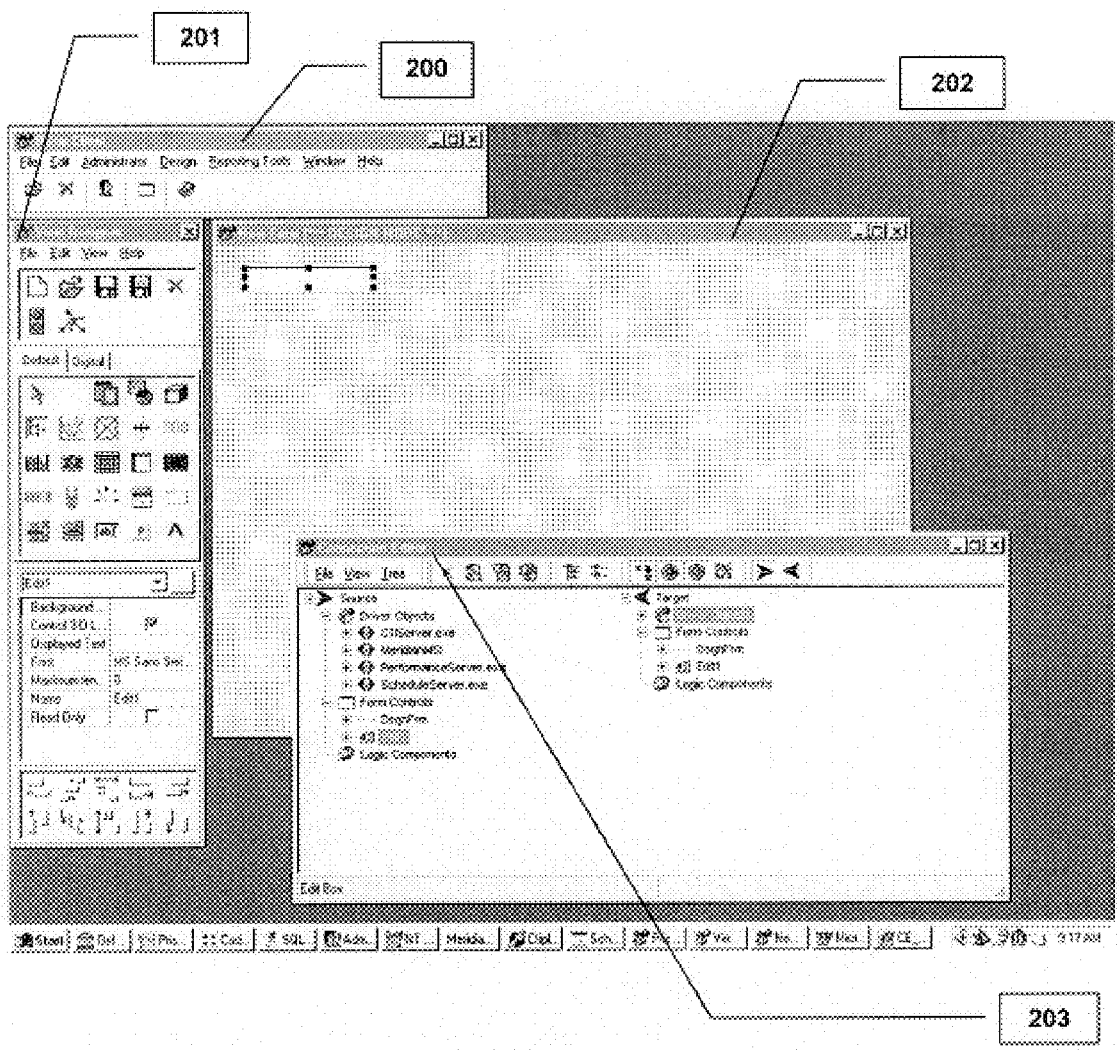
FIG. 2 shows the Graphical User Interface of the preferred embodiment.

FIG. 2 shows the Graphical User Interface of the preferred embodiment including the main Prism Client 200, Application Designer Tool-Bar 201, Design Form 202, and Connection Editor 203. Design Form 202 is where the graphical user interface of new applications is constructed by receiving visual controls from the Application Designer Tool-Bar 201. The Connection Editor 203 shows the status of connections between programs and allows end-users to create connections between programs.

Figure 3:
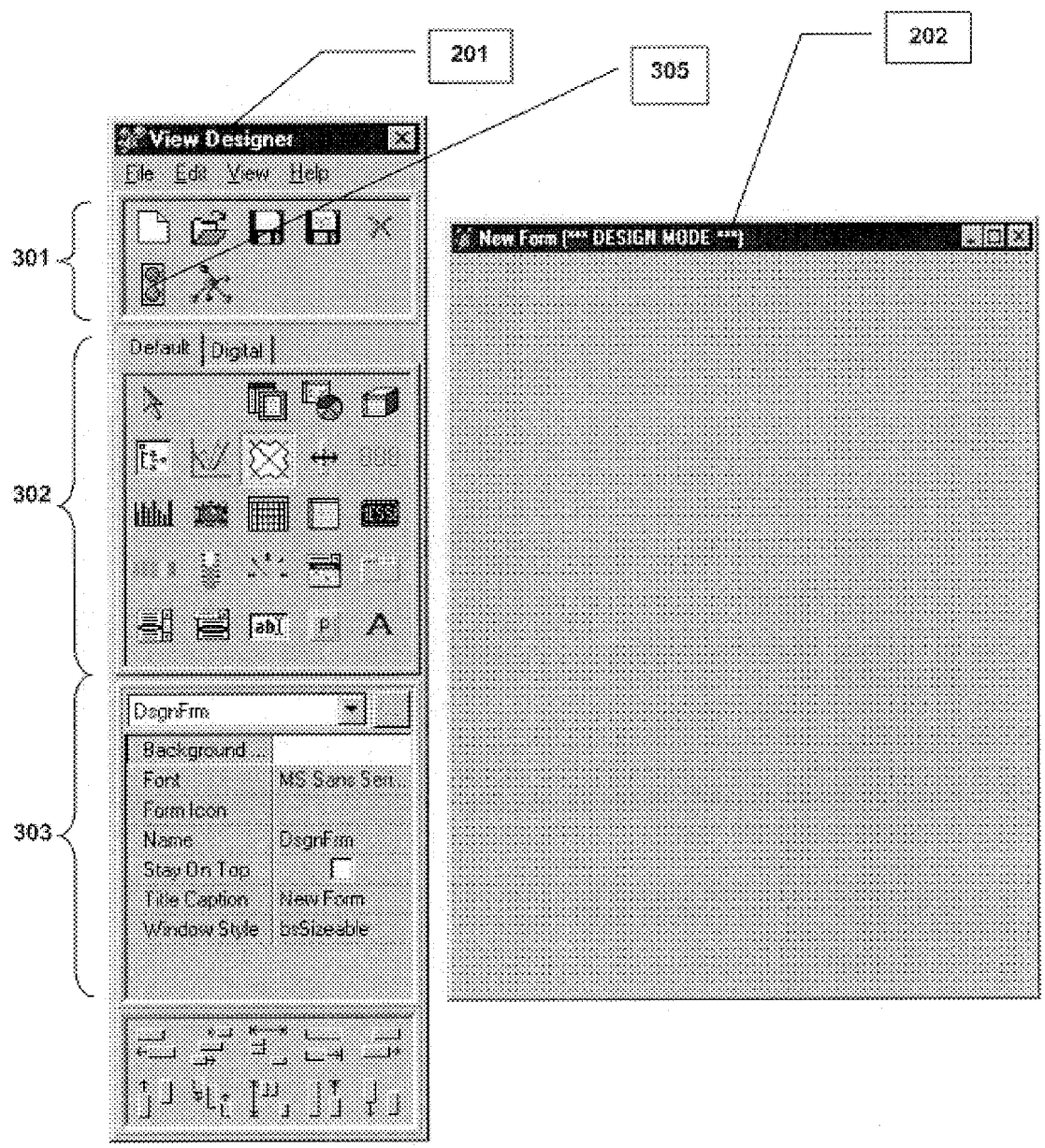
FIG. 3 shows the interface of the preferred embodiment that allows for the graphical construction of a user interface of an application.

FIG. 3 shows the interface of the preferred embodiment that allows for the graphical construction of a user interface of an application. The user selects a visual control from the Control Palette 302 of the Tool-Bar 300 and drags this to the Design Form 202. Visual properties of a highlighted control can then be manipulated using the Property Inspector 303 of the Application Designer Tool-Bar 201.

In the preferred embodiment, the Design Form 304 is implemented as a form class, TForm, of the Visual Component Library (VCL) object framework from Borland$^{SM}$. All the programs available in the preferred embodiment are created as components, which means descending from the TComponent class of the VCL. VCL components have two features utilized by the preferred embodiment. First, components can be added to the memory image of other components, such as when a visual control is placed on the design form. Second, VCL components support a form of object persistence referred to as streaming. Streaming is the act of writing to a buffer, such as a memory image, disk file, or database blob field, the identity of an object's class and the all data associated with the object instance, including other components that have been previously added to its memory image, being streamed. To recreate the object instance, the buffer is streamed into memory. The VCL object framework then instantiates a new object of the class identified in the buffer, and assigns all the stored data into the newly created object. In this manner, the object is recreated exactly as it was when it was streamed out. One that is skilled in the art would see that this is simply one way to achieve the persistence of an application comprised of numerous associated programs.

During the design process, absolutely no programming or manipulation of source code is needed. To configure data-flow between visual controls and non-visual programs, the user selects the Connection Editor Launch Button 305 on the Tool-Bar Menu-Bar 301.

Figure 4A:
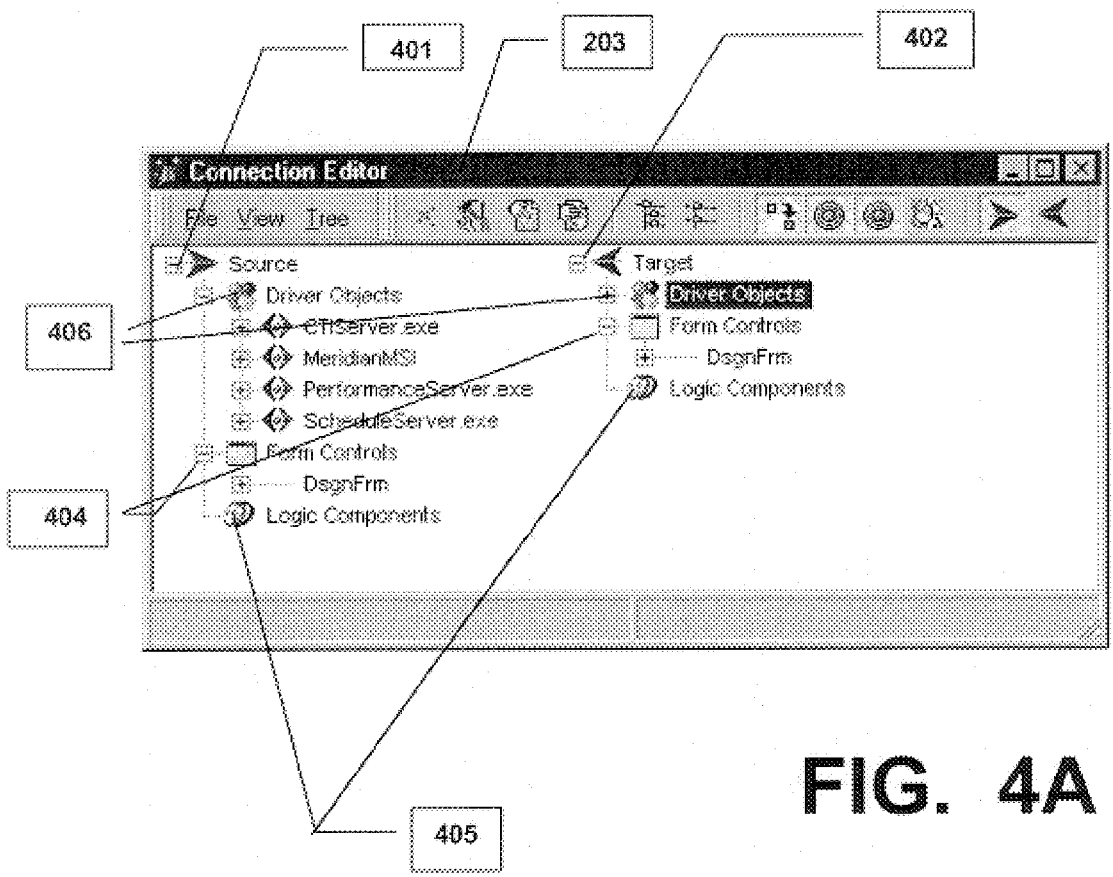
FIG. 4A shows the interface of the preferred embodiment for creating connections between programs.

FIG. 4A shows an expanded view of the Connection Editor 203, launched as described in the previous paragraph, for creating connections between programs. The Connection Editor 203 has a Source Program Tree 401 and a Target Program Tree 402. Programs that have been added to the system are rendered in these trees and grouped into nodes based on the type of programs. Programs internal to the memory of the Connection Editor 203 are grouped as either Form Controls 404 that appear visually on the Design Form 304 or as Logic Components 405 that are non-visual components that perform a processing action. Software Drivers used to communicate with programs external to the memory of the Connection Editor 203 are grouped under the Driver Objects node 406.

In the preferred embodiment, the Connection Editor 203 traverses the list of components that were added to the Design Form 304 component during application development. For each component, the Connection Editor 203 checks the object meta-data to determine its classification (i.e. Visual Component, Driver Object, non-Visual Logic Component, etc. ). Upon gaining this information, the Connection Editor 203 can add the object reference node to both the Source Tree 401 and Target Tree 402. Components can be both sources of data flow and targets of data flow depending on needs of the application.

The Connection Editor 203 needs the ability to interact with the numerous disparate components without having detailed knowledge of each component. Furthermore, each component must be able to interact with any other component in order to carry out connections, a topic that will be described in detail below. This is accomplished by requiring that each component implement a standard interface mechanism.

An important aspect of the present invention is the manner in which disparate programs can expose a standard interaction mechanism allowing interaction with programs by only knowing the details of the standard mechanism and without requiring knowledge of a program's internal implementation. This feature is discussed in detail below.

When many disparate programs, each with unique implementations, need to be accessible by other programs in a dynamic run-time environment, a common technique is utilized to define a standard interface. If a program has design-time recognition of the interface, it can be constructed to exercise the interface without the presence of any machine code implementing the work necessary behind the interface. At run-time, programs that implement the standard interface can then be dynamically connected to the program that calls the standard interface. This allows for a high degree of modularity since there could be many programs supporting a standard interface yet with unique implementations that gives the program using the interface the ability to take advantage of many unique implementations to a single problem. The Connection Editor 203 has a common mechanism to interact with all programs, allow for the interrogation of the interfaces of disparate programs, permit the establishment of connections between disparate programs, and automate the data flow between the interfaces of disparate programs when connections have been established. This process is accomplished in the present invention with an Interface Manager 410.

FIG. 4B shows the Interface Manager 410 of the preferred embodiment, implemented as a Common Object Model (COM) interface. COM is the Microsoft specification for how abstract virtual object interfaces are arranged in the memory of an operating system of a computer.

In the preferred embodiment, the programs that are used to construct applications are derived from Borland's$^{SM}$ Visual Component Library (VCL) object framework. In the case of external programs such as remote servers, executables or libraries, a software driver that is created as a VCL component is utilized handling the external link while still providing the common VCL internal presence.

The Interface Manager 410 exists as a COM Interface that a VCL component implements. The functionality of the Interface Manager is then provided by an internal aggregated object that each VCL component creates in the components private memory space.

The Interface Manager 410 is defined in the source code of the invention in the program unit named PropertyManager and is named the IPropertyManager. (See Appendix A) The aggregated object class that implements the IPropertyManager for components is named PropertyManager. Various other helper classes exist to manage properties and perform other internal utilities.

Automating data flow utilizes the VCL's Run Time Type Information and utility routines allowing disparate components to dynamically read and write the properties of each other based on the connection information stored in the TpropertyManager. TpropertyManager is manipulated by the Connection Editor utilizing the respective IpropertyManager that each component implements.

As depicted in Appendix A, the RTTI routines are encapsulated in the source code of the invention in the Pascal unit named PropSys. Dynamic properties are implemented by creating a binary image of the property data structures at run-time that are compatible with the VCL's RTTI subsystem. Furthermore, the TPropertyDef class provides methods to handle the reading and writing of dynamic property and its data storage.

For a component to be utilized in the Connected Editor 203, it must implement the Interface Manager 410, and must also implement internal code that services the interface and deals with the internal operations on the component that the Interface Manager 410 requires. One ordinarily skilled in the art will recognize that this is but one of numerous standard interface technologies that exist, others including but not limited to API's, pure virtual C++ classes, CORBA interfaces, DCOM interface, etc.

Figure 4C:
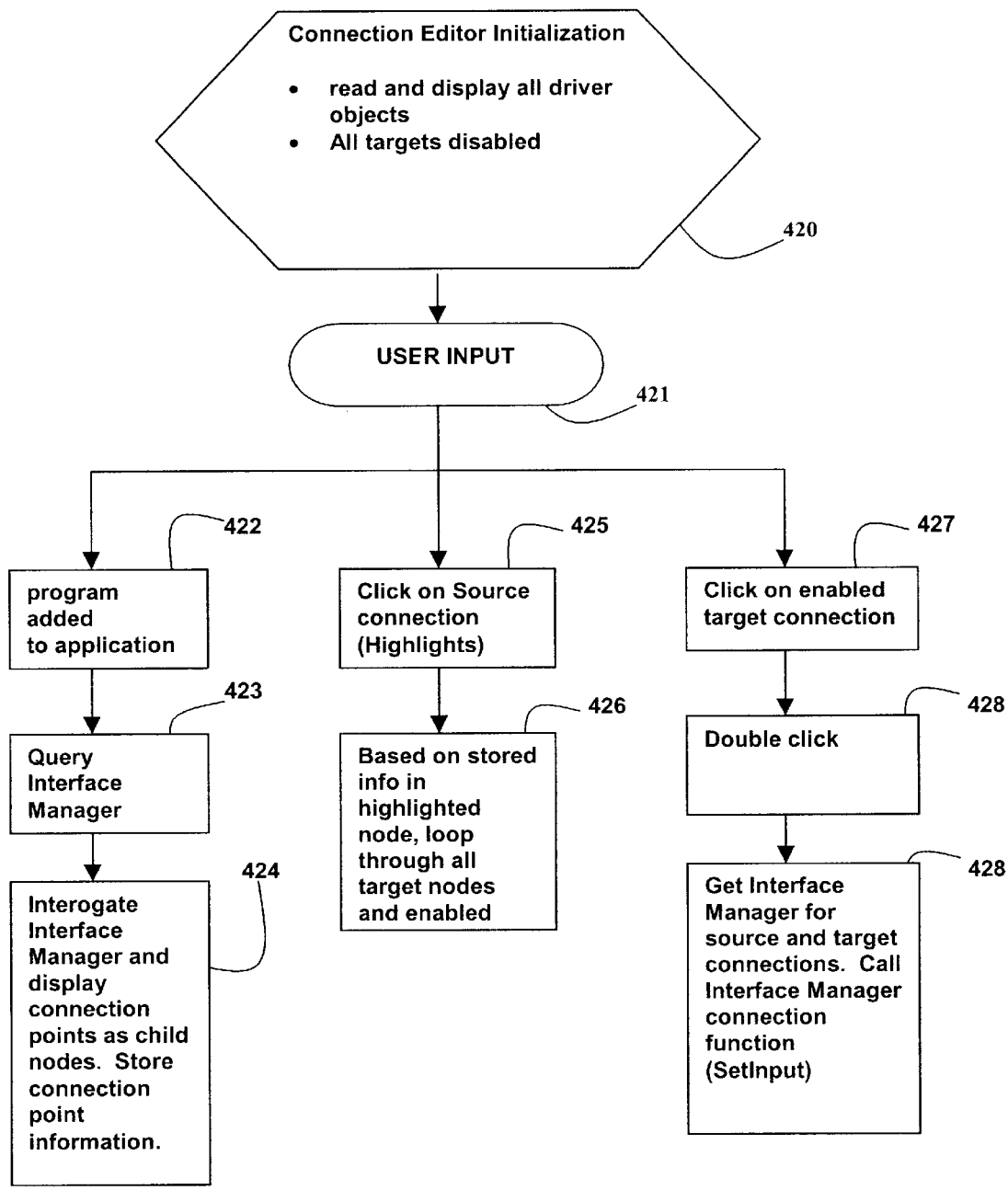
FIG. 4C shows a flow-chart of Connection Editor 203.

FIG. 4C shows a flow-chart of Connection Editor 203 operation in the preferred embodiment. On Connection Editor Initialization 420, all driver objects from application main memory 434 (See FIG. 4D) are added to the Source Tree 401 and Target Tree 402 Views.

When a component is added to the Connection Editor 203, the Connection Editor 203 queries 423 the Interface Manager COM Interface 410. Every VCL component supports the QueryInterface(InterfaceID, InterfaceReference) where the InterfaceID is the unique identifier of the interface and InterfaceReference is the location where the interface is returned. If InterfaceReference returns a nil (0) result, then that component has not implemented the Interface Manager COM Interface 410 and is not available to the Connection Editor 203. Otherwise, the component name is added to both the Source Tree View 401 and Target Tree View 402.

Once the Interface is queried, the InterfaceReference.GetProperties is called to return a data structure containing the list interface properties. Each available property has a record in the properties list that defines its name and type. Each property capable of OUTPUT has its name added underneath the Source Tree View 401. Each property capable of INPUT has its name added underneath the Target Tree View 402. Each node also retains type information to provide on the fly filtering of compatible target properties as different source nodes are highlighted. The Connection Editor 203 then awaits User Input 421. When a component is added to the application, either through visual design or by creating non-visual components, the control flows to 422. The Interface Manager 410 is then queried 423 and the component is interrogated and added 424 as previously described.

When a source connection is highlighted 425, the stored type information isverified, and the Target Tree View 402 is rendered showing interface properties compatible with the highlighted source property. When a target property is selected 427 and then double clicked 428, the Interface Manager 410 is queried for both the source and target components 429, and the following code snip is executed:

TargetInterfaceReference.SetInput( TargetPropertyName, SourceInterfaceReference, SourcePropertyName).

The above method adds the TargetInterfaceReference and Target Interface Property Name to the connection output list for the given Source Property Name in the Source Interface Manager. It also adds the SourceInterfaceReference and Source Interface Property Name to the Input data structure for the given Target Property Name in the Target Interface Manager.

Thus, Interface Manager 410 only requires a reference to another components' interface manager and the name of the connected interface property as the minimum information to establish a connection between interface properties. With this information, the information managers of each component can automate data flow between the components without programming. One ordinarily skilled in the art would know that this is just one of numerous ways that a connection editor—or any program capable of querying data from class meta-data, internal-storage, or external storage—could query available connection points from a program.

Figure 4D:
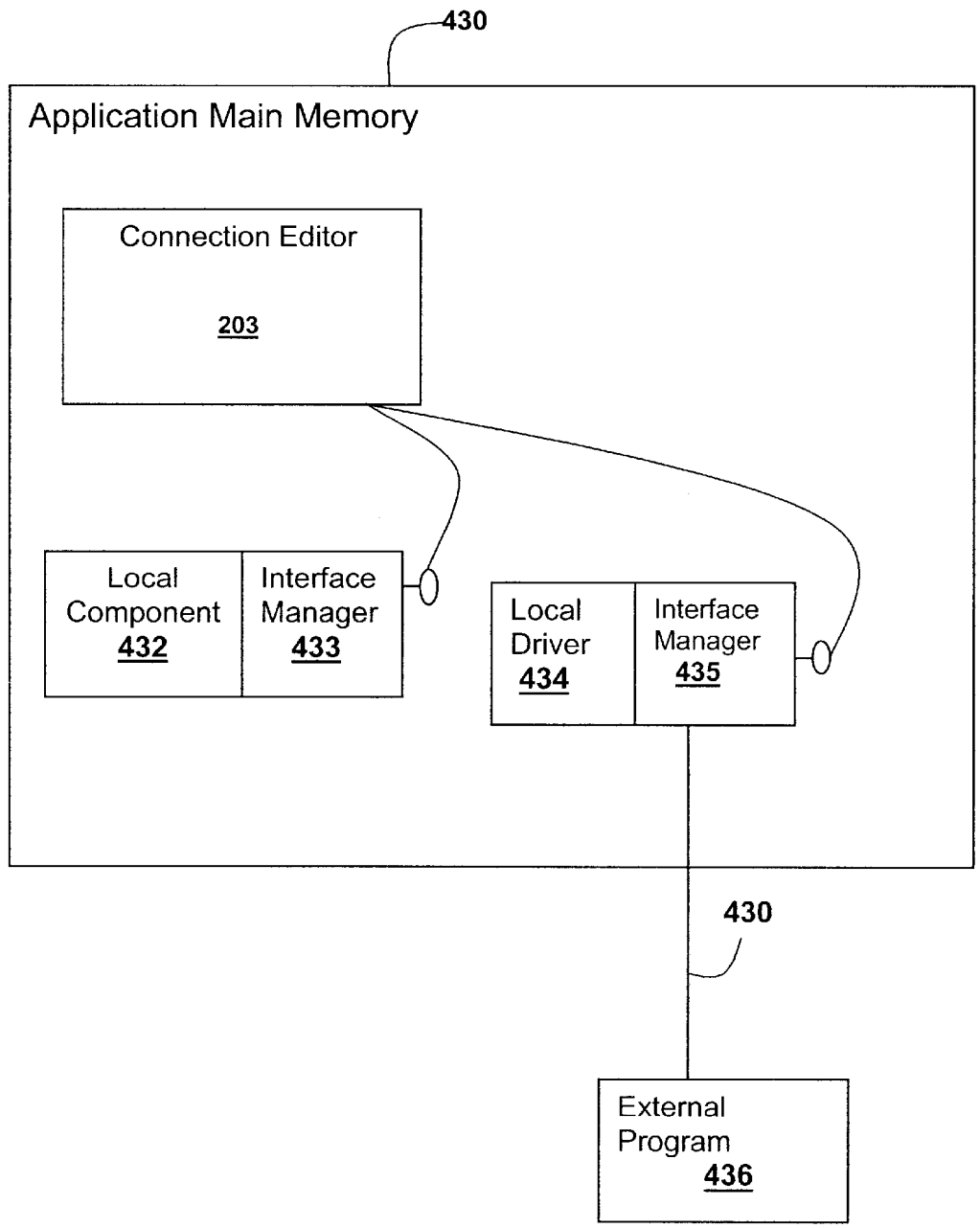
FIG. 4D shows a diagram of Application Memory 430.

FIG. 4D shows a diagram of Application Memory 430. The Connection Editor Program 203 is located in the application memory along with a local component 432 which implements an interface manager 433. An external program 436 is connected to a local driver 434 through a private interface 437. The private interface 437 could be, but is not limited to, API's, network messages, operating system message, Remote Procedure Calls, or a distributed object interface. The local driver 434 also implements an interface manager 435. The Connection Editor 203 has local access to the local component 432 through interface manager 433. Furthermore, despite the remote nature of the External program 436, the Application Memory 430 has access to the External Program's 436 functionality by way of the local driver 434. The Connection Editor 203 can thus expose access to the external program 436 by interacting with the local drivers 434 interface manager 435.

An important concept of the invention is the ability to create a software driver which implements the Interface Manager 410 in the Connection Editor 203 memory space while implementing the necessary code to link with the program of the non-compatible framework or external memory space.

As stated above, the programs that are used to construct applications are derived from Borland's$^{SM}$ Visual Component Library (VCL) object framework. There are scenarios when programs that are desired for inclusion in the invention are not derived from the VCL object framework or are in external memory spaces, such as but not limited to, remote servers, executables, and dynamic link libraries.

These non-VCL or external programs are easily exposed in the invention through the creation of a VCL based software-driver. The driver will implement the Interface Manager 410 as any program compatible with the invention must do, and will provide a virtualized access to the desired program. For example, the driver could be constructed to link to a Win32 DLL. The API of the DLL would then be encapsulated by the interface of the driver. The Interface Manager 410 of the driver would then expose this encapsulated API. In the Connection Editor 203, the DLL would appear as an available program due to the presence of the VCL based driver, but the end-user would be completely shielded from implementation details.

Another more complex example is the construction of a driver to provide access to DCOM Servers. DCOM servers are typically remote to the client and utilize Remote Procedure Calls to handle network communication.

In the preferred embodiment, a common framework is constructed to facilitate the construction of drivers for remote servers. To the Connection Editor 203, the driver is as a standard VCL component that implements an Interface Manager 410. The interface of the server is exposed in a similar manner as in the DLL example above with the driver providing a pass-through mechanism to the server and back. (See Appendix B)

The framework is implemented in the Pascal units, 'BaseDriver' and 'BaseInterface.' The 'BaseInterface' unit further demonstrates the preferred embodiment's implementation of Method Interface Objects for the case of remote servers.

The end result of connecting to external programs is that both the external and the local programs are indistinguishable to the end-user in the user interface of the Connection Editor 203. Not only does the Connection Editor 203 shield the end-user from details of the internal implementation of programs—a common goal of "Object Oriented Programming"—but it also shields the end-user from details of program location, communication protocols, and numerous other issues that are the domain of the skilled programmer.

Figure 5A:
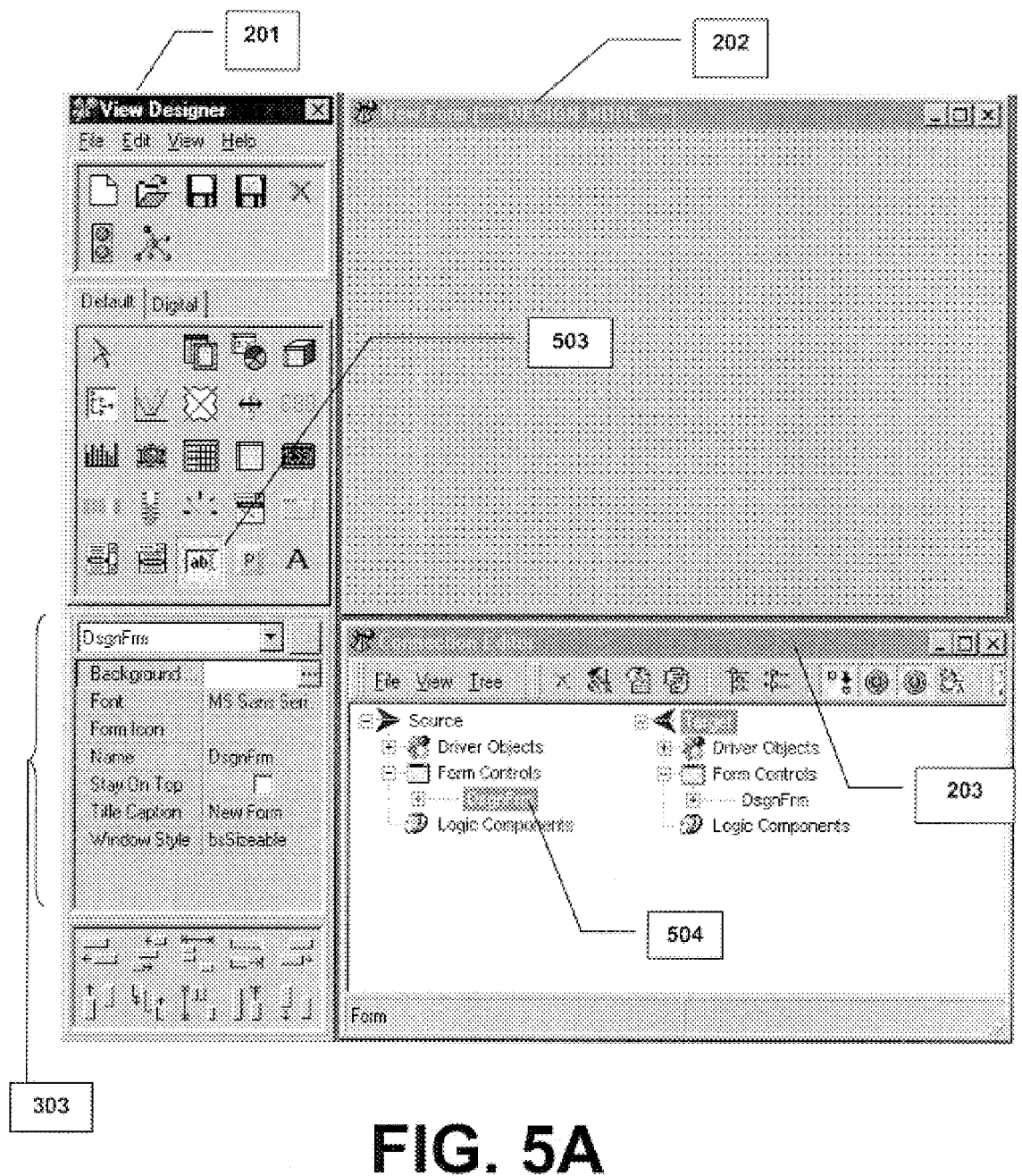
FIG. 5A shows the application development interfaces of the preferred embodiment prior to any development actions.

FIG. 5A shows the key application development interfaces of the preferred embodiment prior to any development actions, the Application Designer Tool-Bar 201, the Design Form 202, and the Connection Editor 203. The "DsgnFrm" node 504 is highlighted in the Connection Editor 203 that causes the "DsgnFrm" properties to be rendered and editable in the Application Designer Tool-Bar's 201 Property Editor 303. An icon of an Edit Box Design Component 503 is highlighted. When the user places the mouse pointer over the Design Form 202 and presses the left-mouse button, an Edit Box component will be created on the Design Form 202 and added to the Connection Editor 203.

Figure 5B:
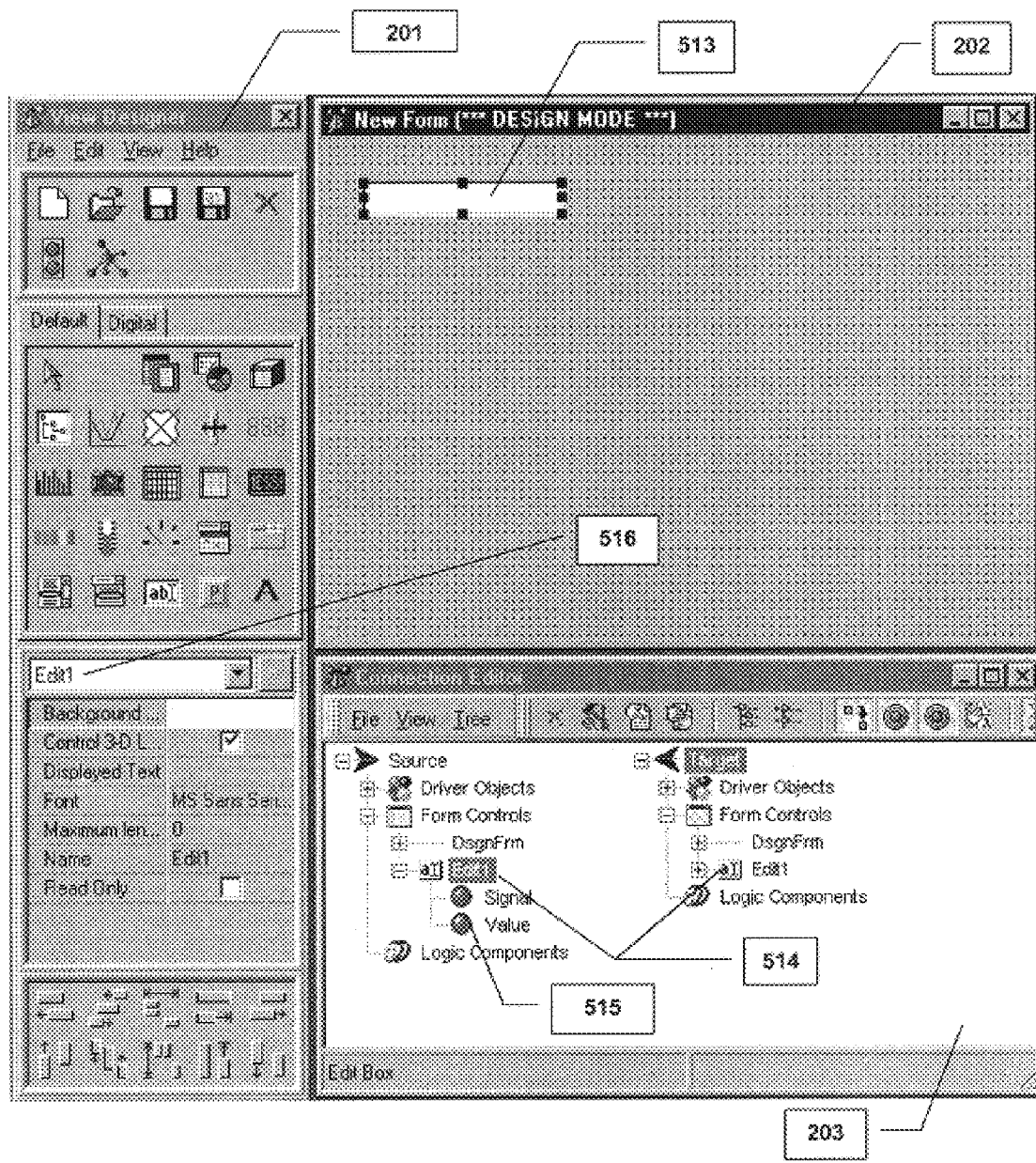
FIG. 5B shows the creation of an Edit Box Component for editing visual properties.

FIG. 5B shows the key application development interfaces of the preferred embodiment, the Application Designer Tool-Bar 201, Design Form 304, and Connection Editor 203, after the action of pressing the left-mouse button over the Design Form 202 described above. An Edit Box Component 513, named by default to "Edit1," is created on the Design Form 202. The Connection Editor 203 has added the Edit Box Component Interface 514 to its tree views under the "Edit1" name and exposed the Edit Box Component Interface Properties 515 names "Signal" and "Value." The Application Designer Tool-Bar 201 Property Editor 516 now shows the "Edit1" component available for editing visual properties.

Figure 5C:
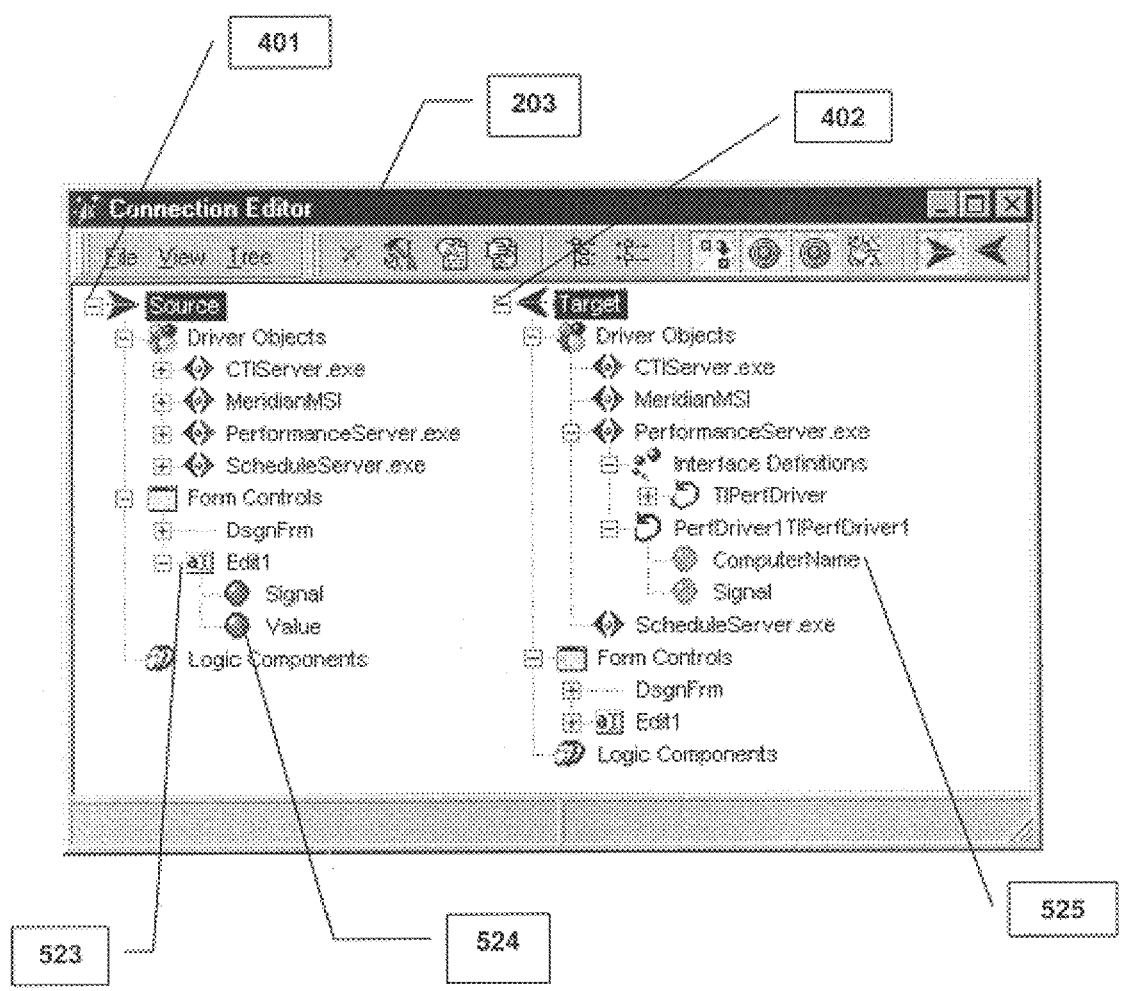
FIG. 5C shows an isolated view of the Connection Editor 203 with both expanded Source Tree 401 and Target Tree 402 views.
Figure 5D:
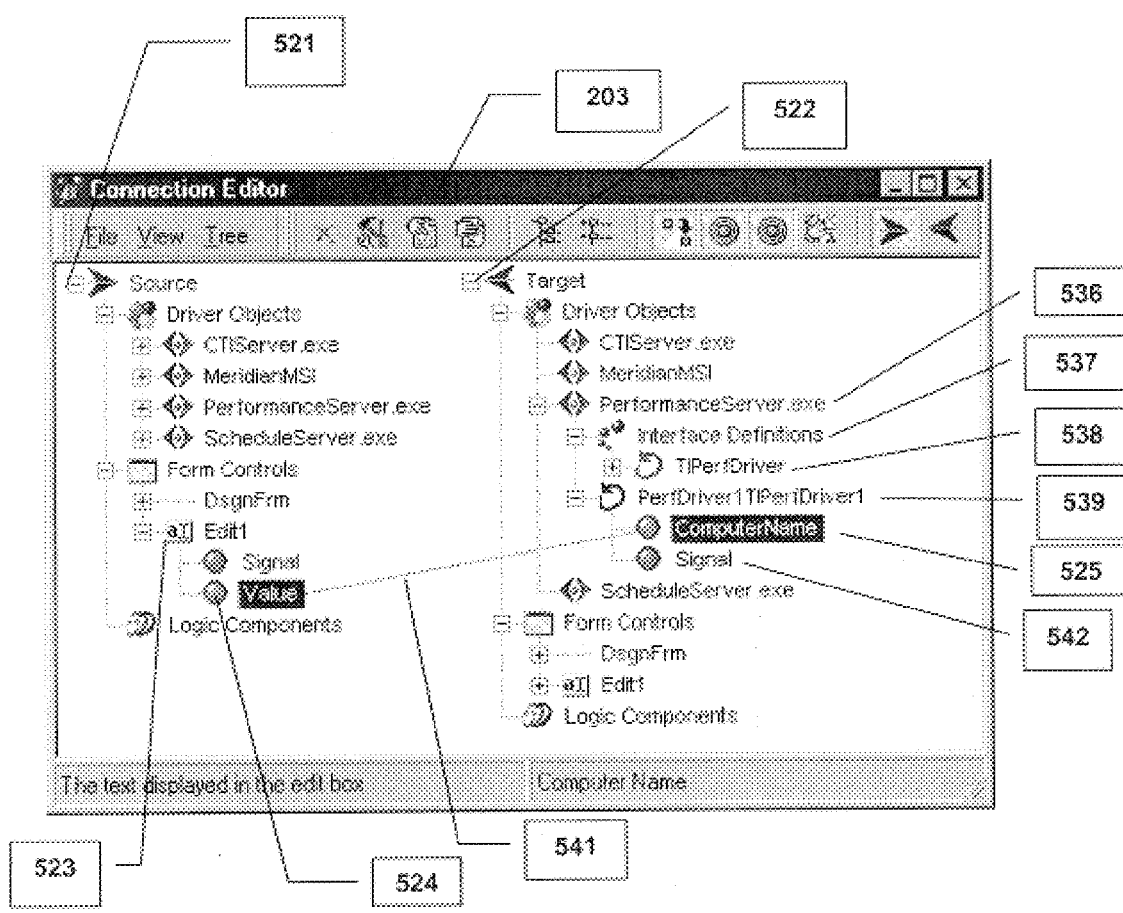
FIG. 5D shows the Connection Editor 203 after a connection has been made between two disparate programs.

FIG. 5C shows an isolated view of the Connection Editor 203 from FIG. 5B. The Edit1 Component node 523 is expanded on the Source Tree View revealing Interface Property "Value" 524. The root of the Source Tree View 401 is highlighted, and thus as indicated in FIG. 4D, all interface properties on the Target Tree View 402 are disabled as indicated by being grayed out. In FIG. 5D, selecting Interface Property Value 523 enables the compatible interface properties on the Target Tree View 402. In this case, the Interface Property "ComputerName" 525 is enabled. By double clicking on this property, a connection will be made.

FIG. 5D also shows an isolated view of the Connection Editor 203 5C after a connection 541 has been made. From the Source Tree View 401, the Interface Property "Value" 534 now has a Connection Line 541 to the Target Tree View 402 Interface Property "ComputerName" 540. This indicates that these two properties from two disparate programs are connected and data from the Interface Property "Value" 524 will automatically propagate to the Interface Property "ComputerName" 525.

API's, remote procedure calls, and object methods are more complex than individual properties. In these cases, it can be necessary to populate a parameter list and then signal the appropriate action to be taken which utilizes the entire parameter list. In the preferred embodiment, method interfaces are supported through the creation of a Method Interface Object (MIO). A MIO is a program, constructed as a VCL component that implements the Interface Manager and encapsulates a particular method of a DLL, remote server, or other program. The parameters of the method are then exposed as individual properties of the MIO which appear separately in the Connection Editor 203.

FIG. 5D displays an example MIO and shows a Target Tree View 402 where a Driver Object "PerformanceServer.exe" 536 node has been expanded to reveal an Interface Definitions node 537 that has also been expanded to reveal a Method Interface Definition "TIPerfDriver" 538. The Method Interface Definition allows the user to inspect the method interface to decide if it is needed and whether it should be created by only a click of the mouse. If created, a Method Interface Object will appear as a child node of the parent component. The Method Interface Object (MIO) allows for procedures and functions with parameter lists to be exposed from a program interface by the use of a component dynamically created by the user when required. The MIO implements the Interface Manager interface 410 and thus can display the method parameters as interface properties on the Connection Editor 203 Tree Views 401 and 402.

As demonstrated in FIG. 5D, the MIO "PerfDervier TIPerfDriverl" 539 has been created and reveals Interface Property "ComputerName" 525, that is an input property to the method being handled. Interface Property "Signal" 542, when set, communicates to the MIO to invoke the method. As demonstrated, exposing the properties of program interfaces allows for applications to be constructed utilizing a visual Connection Editor 203 without programming. However, to create real world applications, the developer must be able to interact with data that is typically dynamic and discovered at run-time.

The "Interface Manager" of the present invention has the ability to create and manage Dynamic Properties. Dynamic Properties are interface properties that are not associated with a static element of a program's interface. Thus, they can be created in response to a run-time condition, such as the discovery of data or user input. This allows a program to alter its behavior on the fly without programming, yet still retain the same visual development paradigm using the Connection Editor 203 as previously described. Since the purpose of the vast majority of computer applications is to process data, without Dynamic Properties, visual application development would be capable of little more than simple user interfaces.

SQL, or Structured Query Language, is a standardized mechanism to allow for the manipulation (insert, delete, retrieve) of sets of data in row and column format in Relational Database Management Systems (RDBMS). The SQL language is text based and is interpreted by the RDBMS to set aside the result set requested. Each RDBMS defines an API for the programmatic submission and retrieval of that information from the database application. Further programs exists to define a common interface to the submission and retrieval of SQL statements and SQL result sets such as Open Database Connectivity (ODBC), Access Data Objects (ADO), and the Borland[SM] Database Engine (BDE). The state of the art database programming uses one of these common interface programs to submit a text based SQL statement that then returns a binary result set. Using programming, one can then loop through each record in the result set to interpret or display the data by moving or copying the data into visual display components.

Figure 6A:
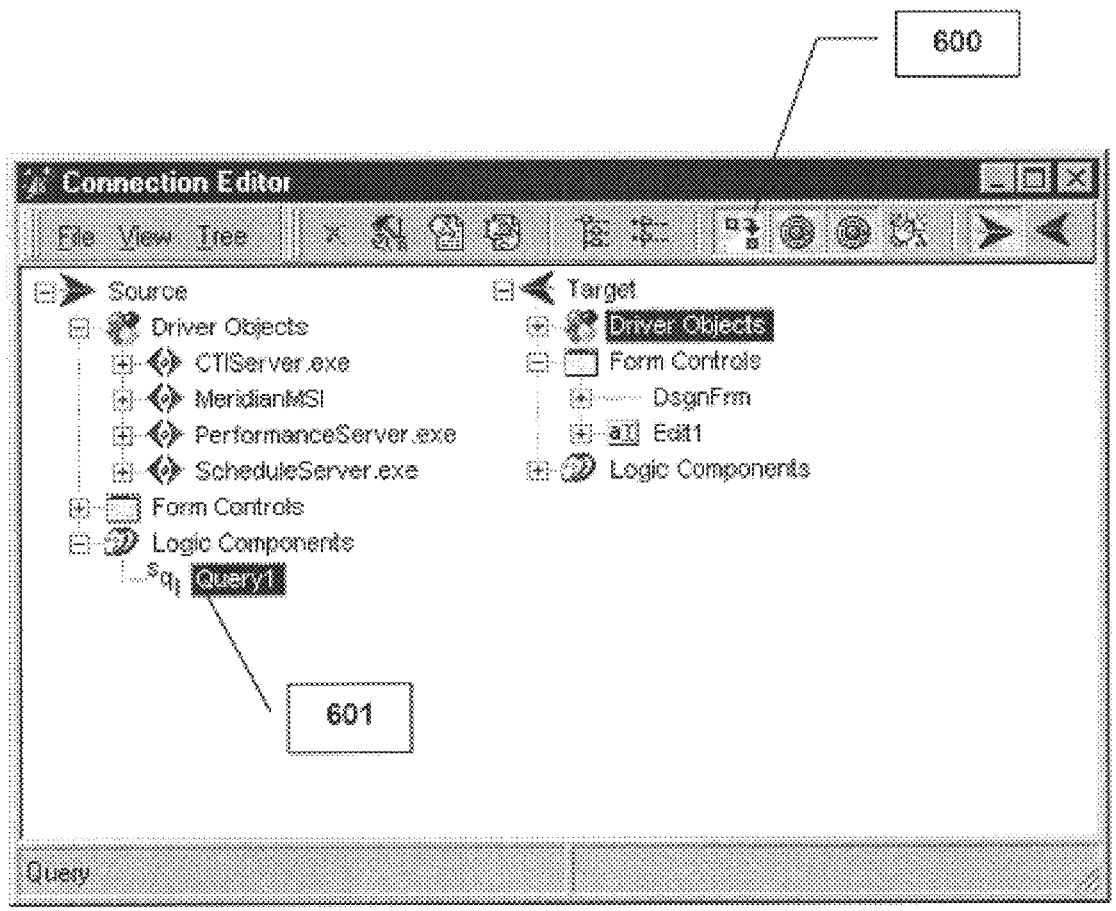
FIG. 6A shows a Logic Component, Query1 601, created in the Connection Editor 203.

One example of the preferred embodiment's use of Dynamic Properties is in the handling of parameterized SQL queries and the analysis of result sets from databases. FIG. 6A shows the Connection Editor 203 with a Logic Component, Query1 601, added. The Query1 601 component has implemented the Interface Manager 410 as the requirement to interact with the connection Editor 203 as previously discussed. The Query1 601 component allows the execution of a SQL statement against a database server to retrieve data. Dynamic Properties areused to allow the developer to specify parameters of the query statement that will appear as part of the Query1s 601 interface properties allowing for full access in the Connection Editor 203.

Figure 6B:
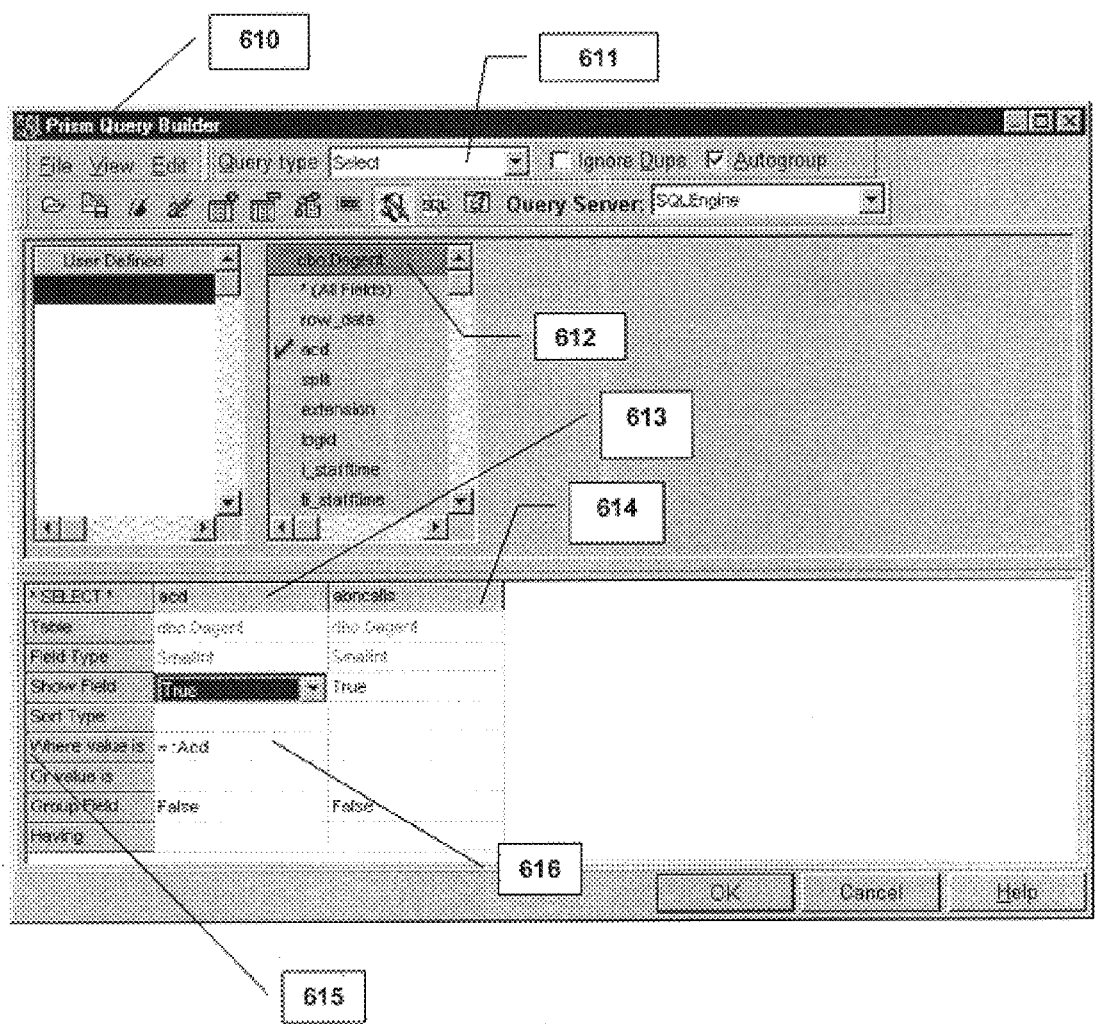
FIG. 6B shows the Graphical Query Builder 610 interface.

FIG. 6B shows the Graphical Query Builder interface 610 of the preferred embodiment. In this example, the Query Type 611 is a "Select" statement from the Table 612 "dbo.D-agent." Two columns, "acd" 613 and "abncalls" 614, are selected. The "acd" column 613 is parameterized by including a "Where" Clause 615 and instead of a literal value, a colon is placed in front of a variable name: "=:Acd"616. This process creates a query of "abncalls" 614 from table "Dagent" 612 where "acd" equals a value from a connection to be determined at run-time. The equivalent SQL statement is as follows:

SELECT t1.acd, t1.abncalls
FROM dbo.Dagent t1
WHERE (t1.acd=:Acd)

Figure 6C:
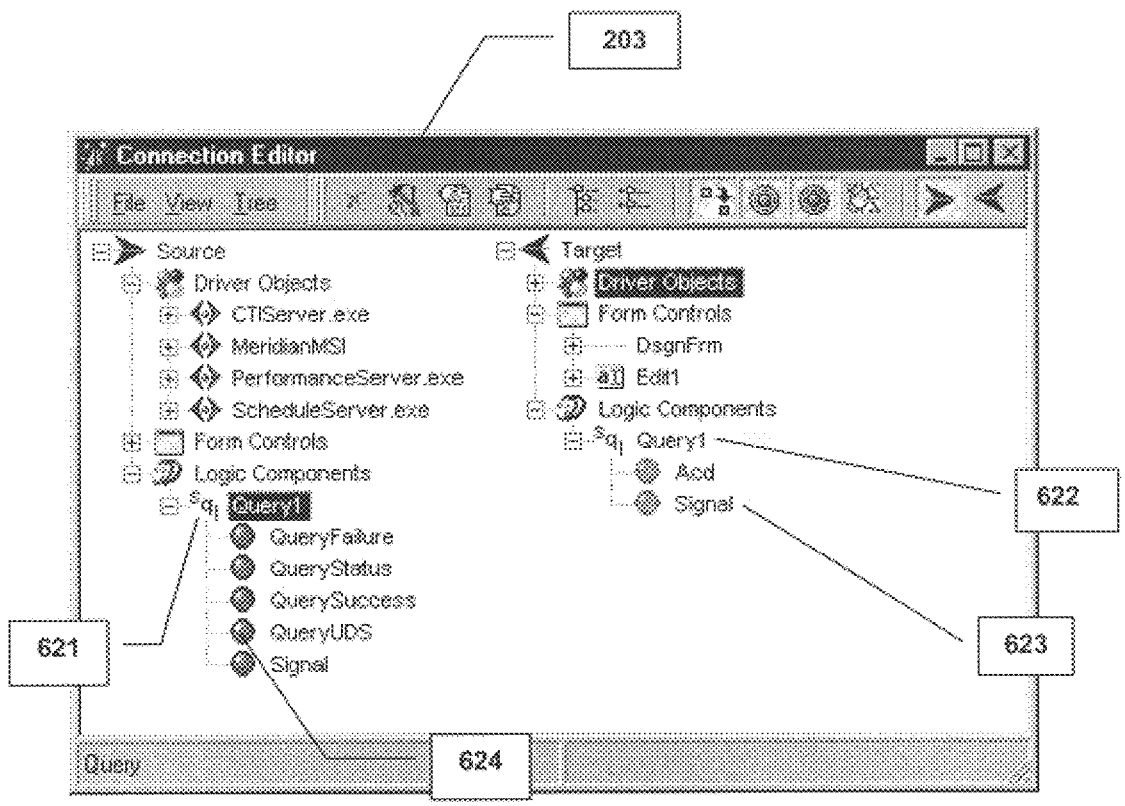
FIG. 6C shows the Connection Editor's 203 representation of a program interface after the creation of the query in the Graphical Query Builder 610.

FIG. 6C shows the Connection Editor's 203 representation of the Query1 Source 621 interface and Query1 Target 622 interface after the creation of the above query in the Graphical Query Builder 610. On the Query1 Target 622 interface, the "Acd" Interface Property 623 is now available for accepting input connections. This allows the user developing the application to use the same connection process described above to set this value from a source of the user's choice. The result set is available as the Query1 Source 621 Interface Property QuerytUDS 624.

The SQL Query Component process is one example of how the Interface Manager 410, with its dynamic property capabilities, and the Connection Editor 203 can be used to provide the manipulation of data discovered at run-time and/or dynamically supplied by the application developer without the requirement of programming.

In the preferred embodiment, a Universal Data Set (UDS) represents a buffer that can represent structured data, records which contain multiple columns or fields of primitive data types, such as but not limited to results sets from database queries, CTI data streams, network messages, etc. The Query1 Source 621 Interface Property QueryUDS 624 contains the result set from the query from the previous example. The current state of the art is to use programming to send the UDS to a program, such as a Graph Component that would visually present the entire data set.

Figure 7A:
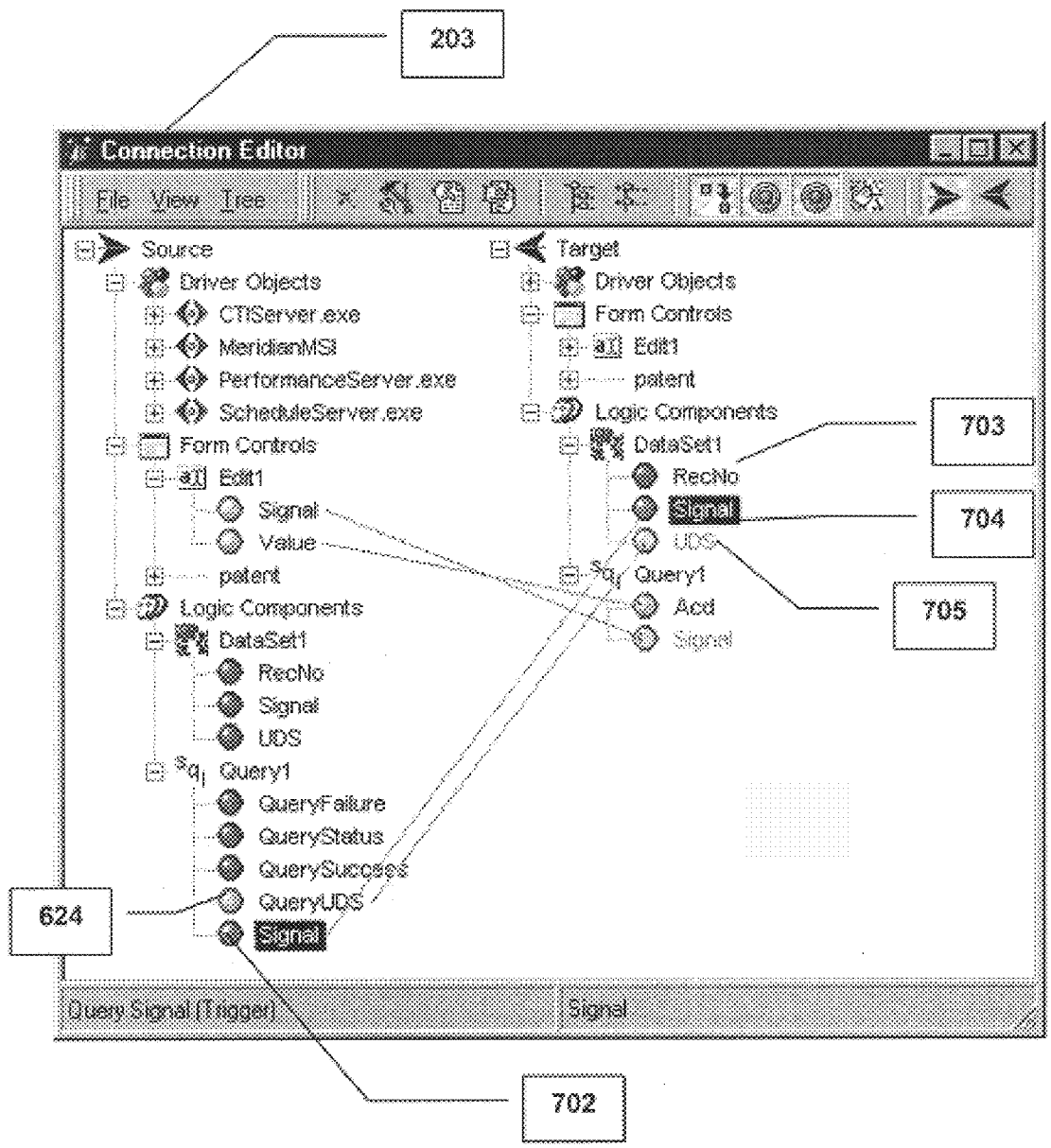
FIG. 7A shows the Connection Editor 203 after a Data Set Component DataSet1 703 has been created.

One example of the preferred embodiment's use of Dynamic Properties is in the handling of structured data buffers in the form of a UDS to allow for analysis of individual columns. FIG. 7A. shows the Connection Editor 203 after a Data Set Component DataSet1 703 has been created. The DataSet1 703 has Interface Property UDS 705 for the input of a structured data buffer. Interface Property QueryUDS 624 is connected to the UDS 705. This connection propagates the structured data buffer to the DataSet1 703 component for run-time analysis.

Figure 7B:
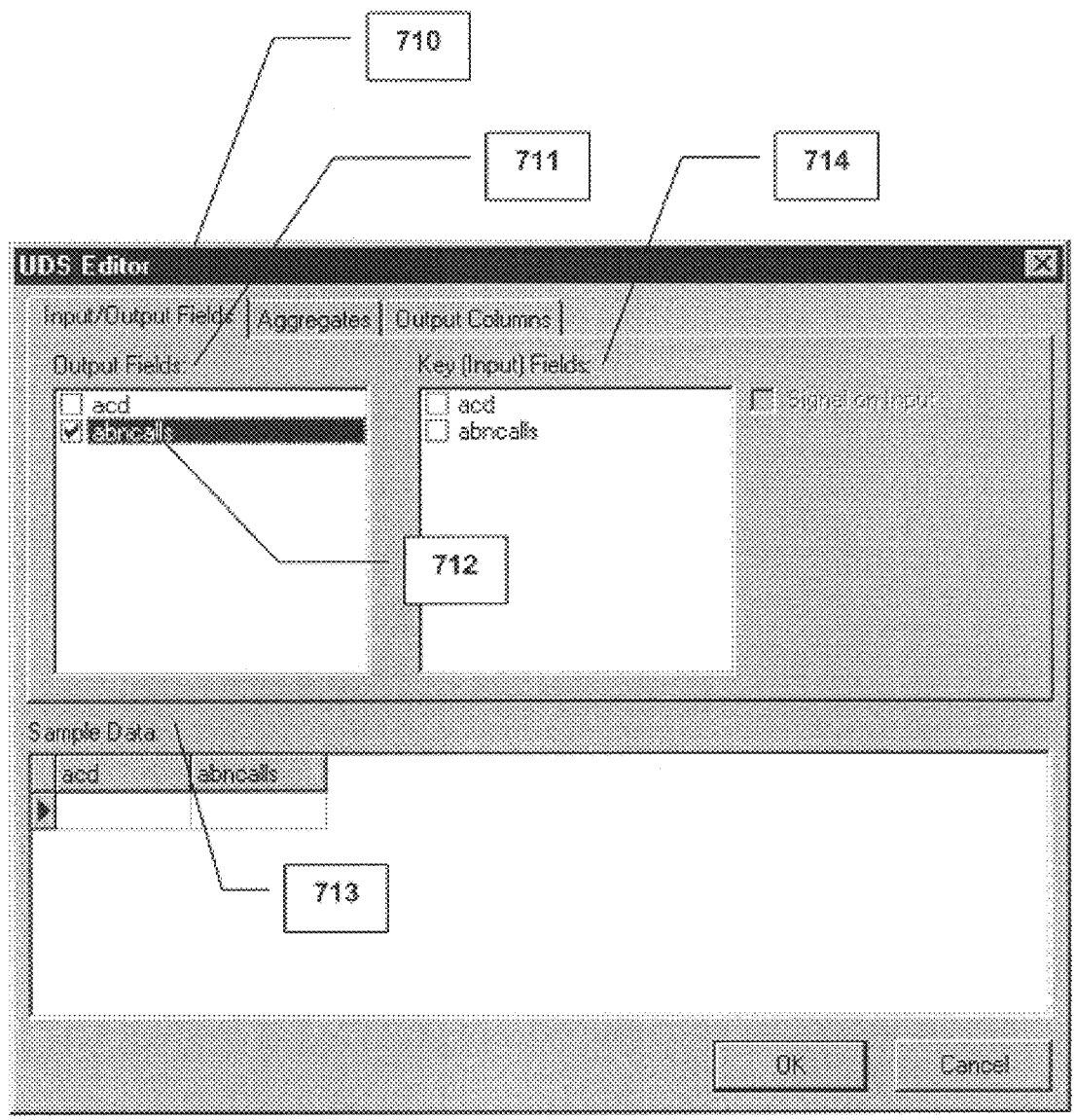
FIG. 7B shows the DataSet1's 703 UDS Editor 710 allowing selectively exposing of columns in the Connection Editor 203.

FIG. 7B. shows the DataSet1's 703 UDS Editor 710 of the preferred embodiment that allows for the selectively exposing of columns in the Connection Editor 203. The Sample Data Grid 713 shows the contents of the Interface Property UDS 705 that will be identified by one ordinarily skilled in the art to be the result set returned from the Query1 601 from the previous example. To expose individual columns, the Output Fields 711 and Key (Input) Fields 714 interfaces show the columns with the ability for the user the check which shall appear on Connection Editor 203. A check has been placed on "abncalls" 712 column in the Output Fields 711 interface.

Figure 7C:
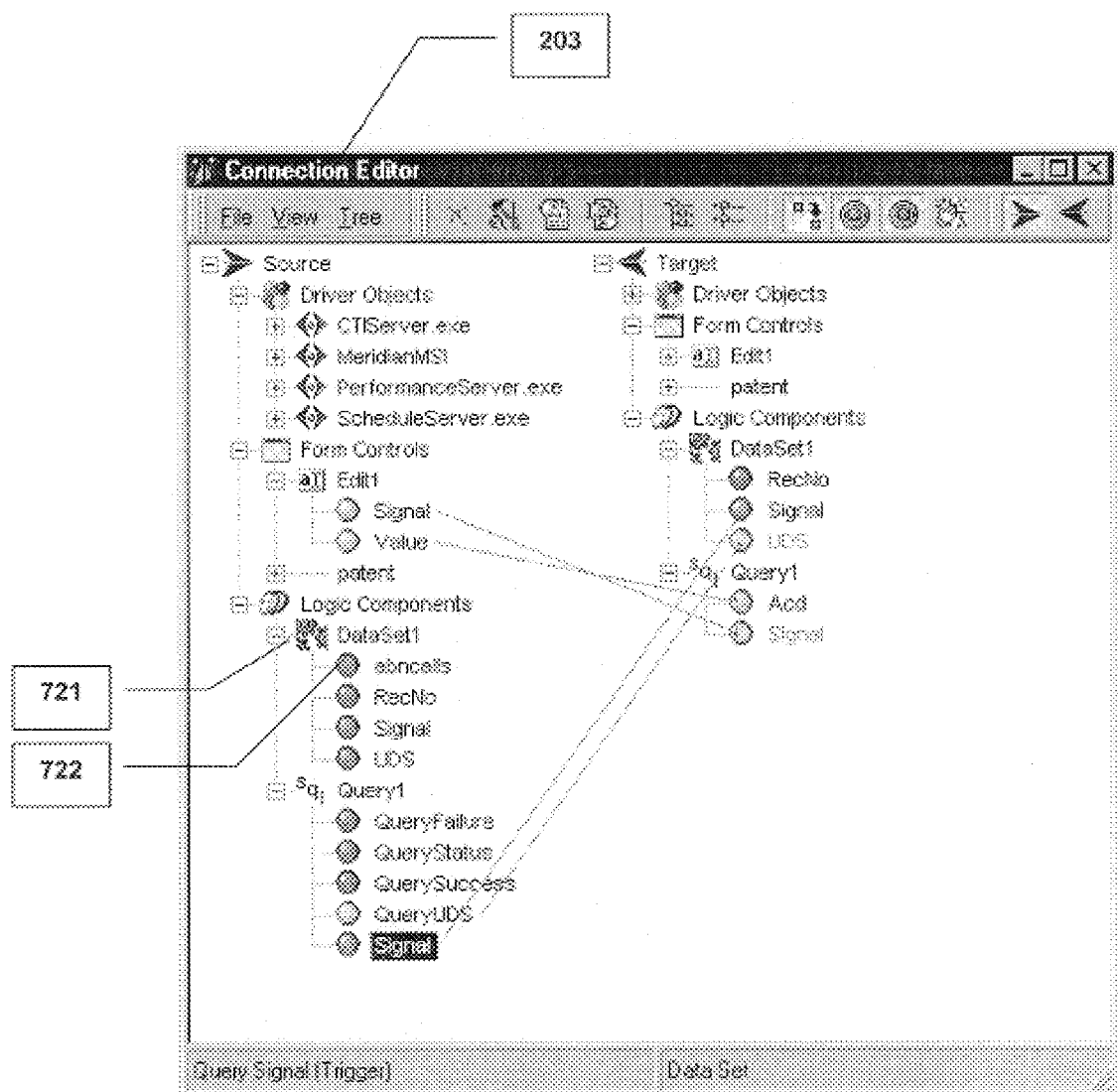
FIG. 7C shows Connection Editor 203 after using UDS Editor 710.
Figure 8:
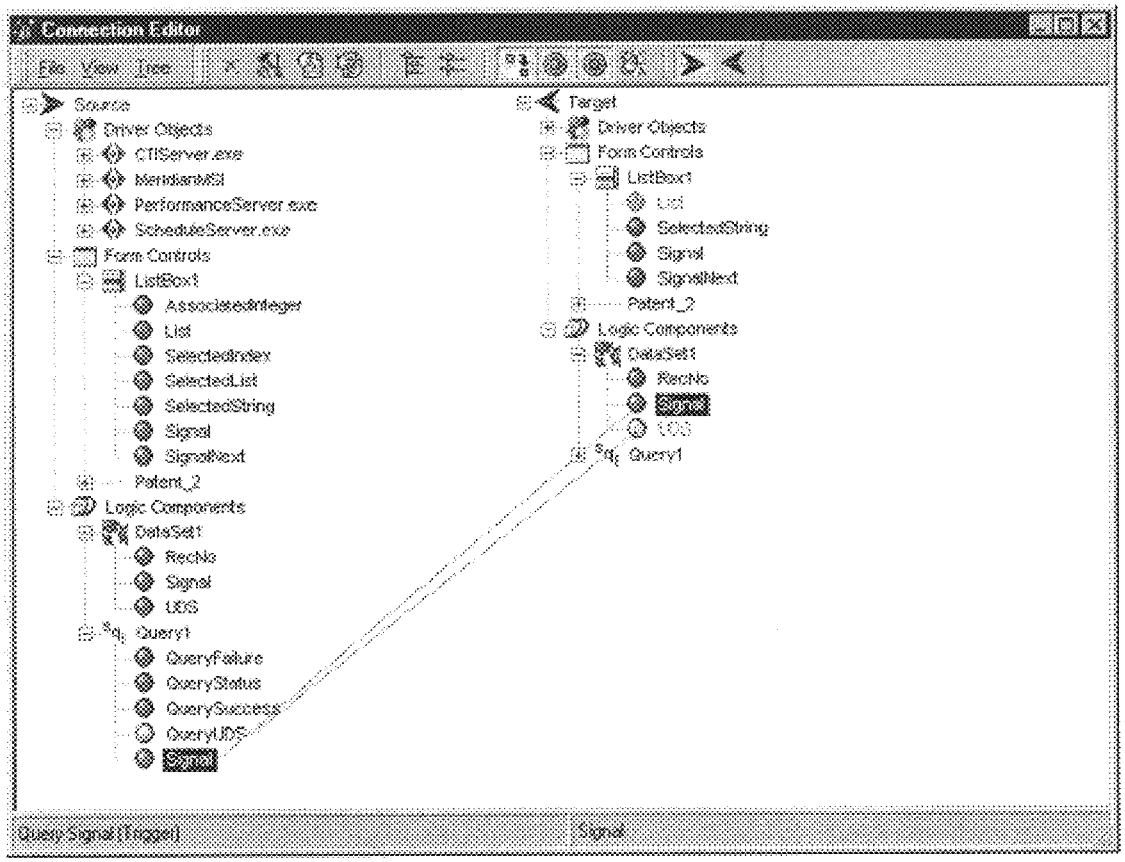
FIG. 8 depicts the connection editor of FIG. 5C showing a connection for putting a set of data into a list box from a query.
Figure 9:
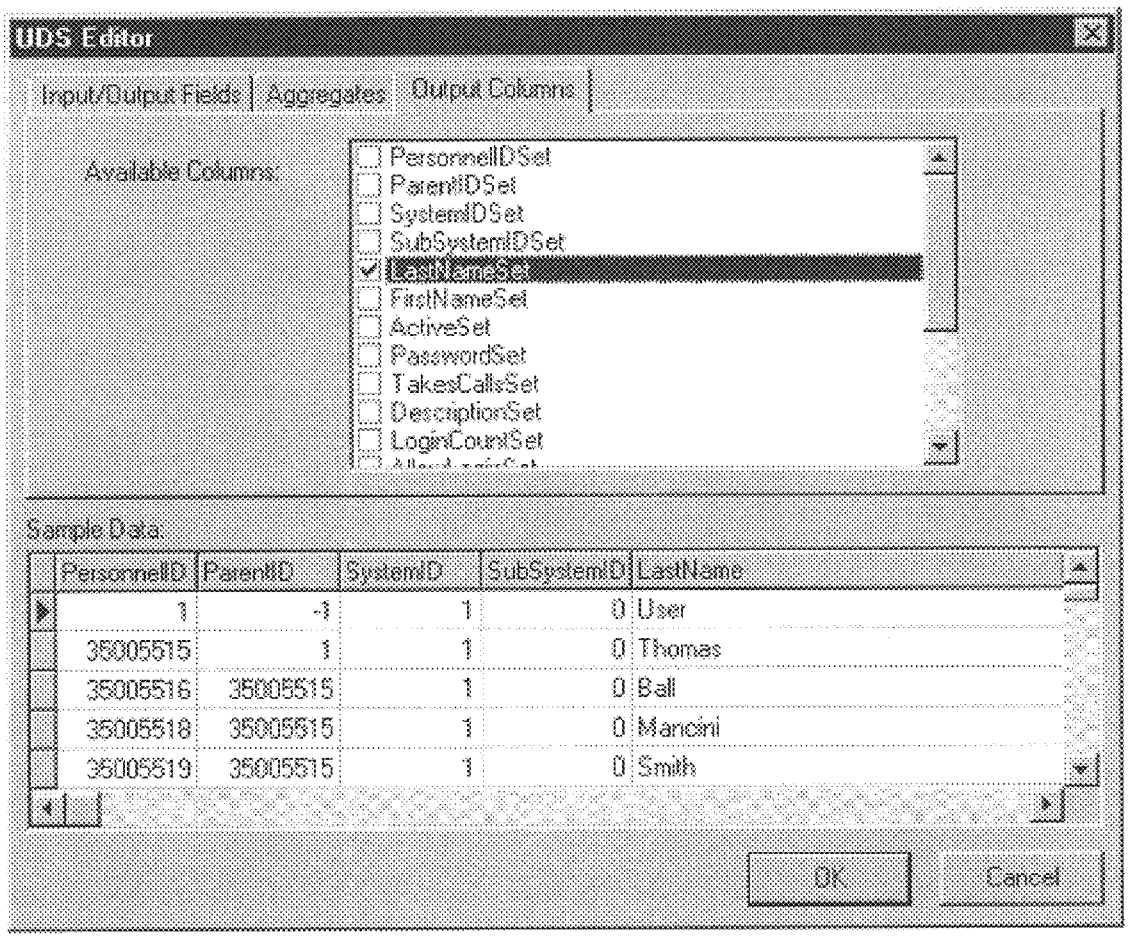
FIG. 9 depicts the UDS editor of FIG. 7B for selecting an available column to be exposed as a set.
Figure 10:
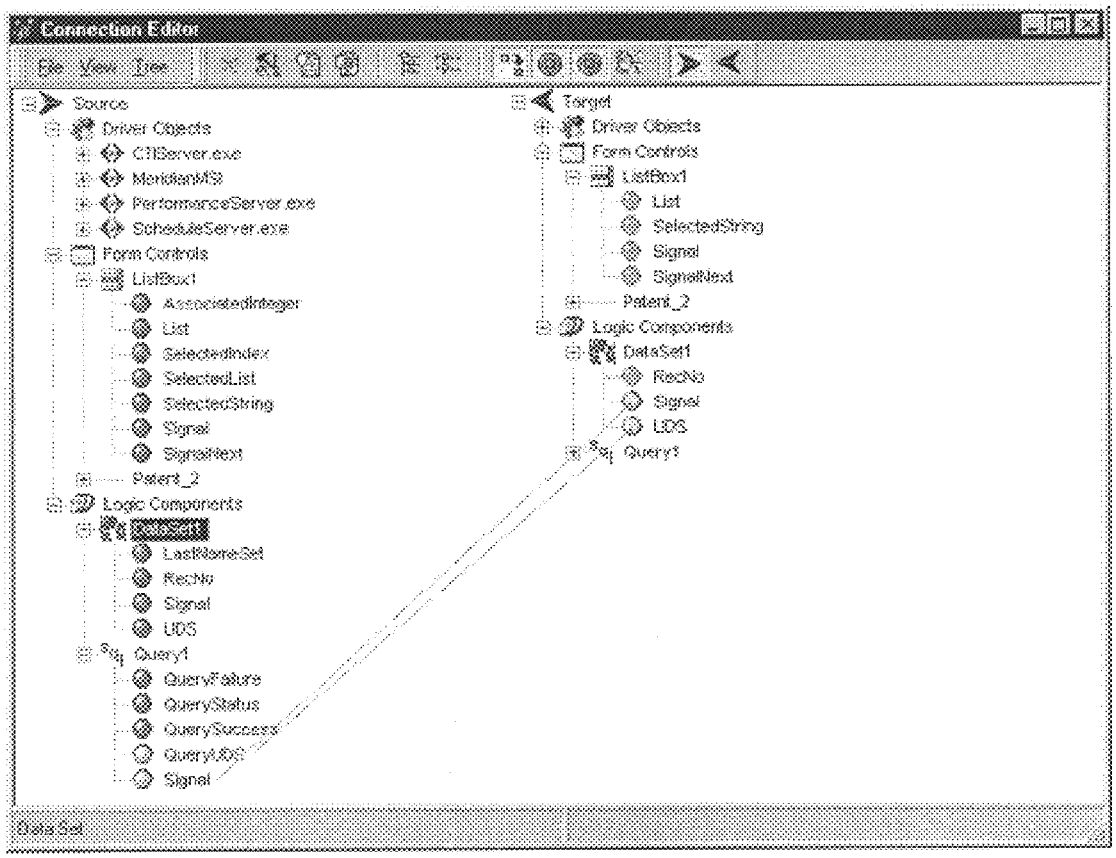
FIG. 10 depicts the connection editor of FIG. 5C showing the selected column from FIG. 9 exposed as an output.
Figure 11:
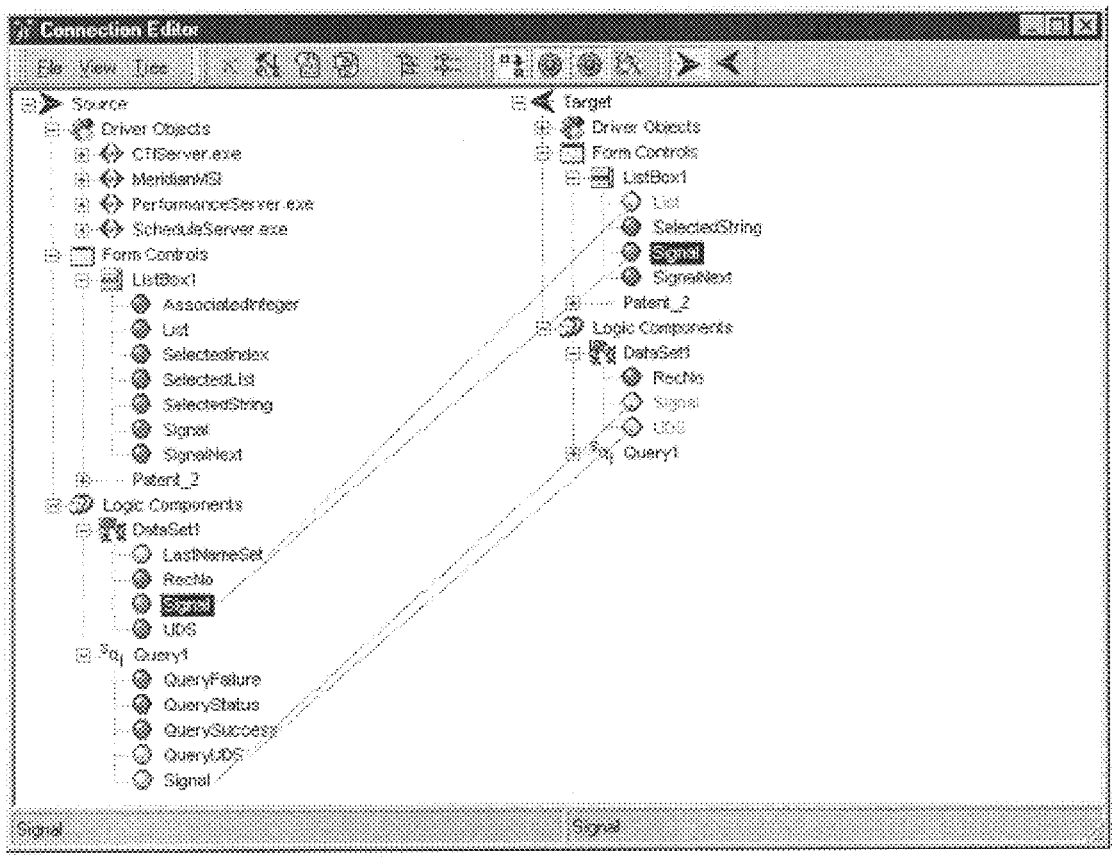
FIG. 11 depicts the connection editor of FIG. 5C showing a connection between the listbox list input and the selected column from FIG. 9 that is exposed as an output.
Figure 12:
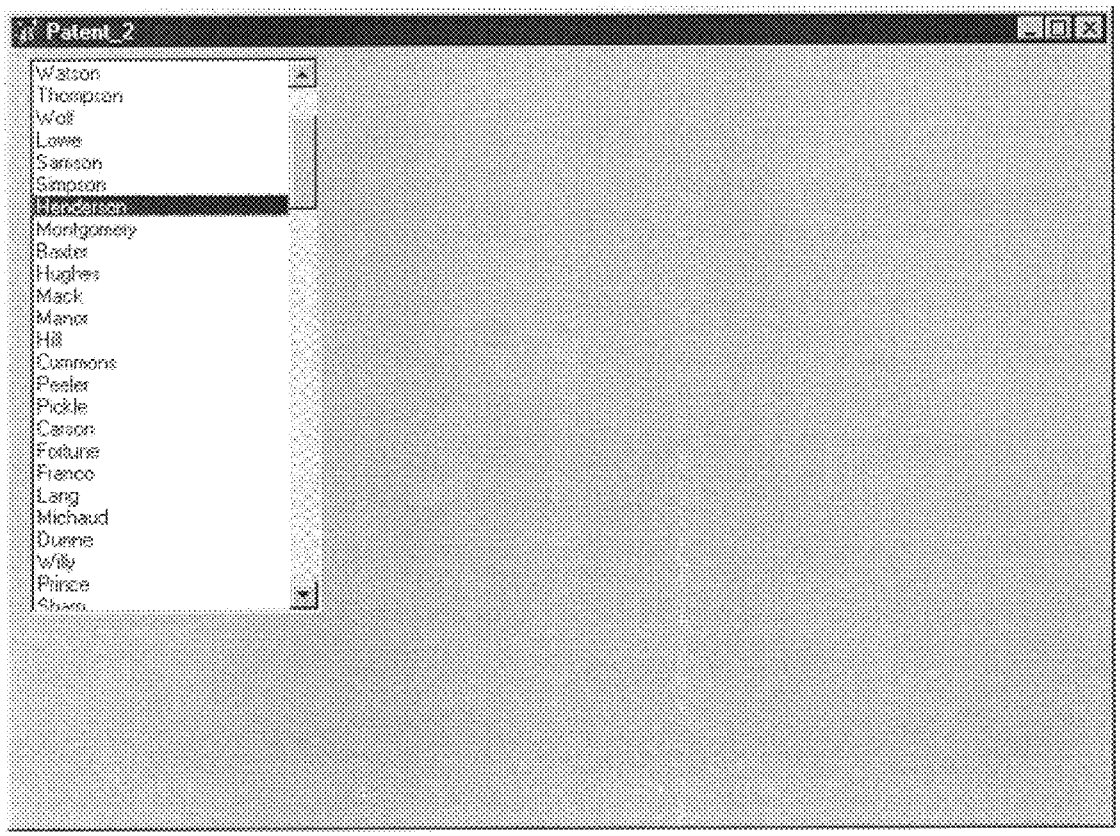
FIG. 12 depicts query execution of the selected column from FIG. 9 that is exposed as an output.
Figure 13:
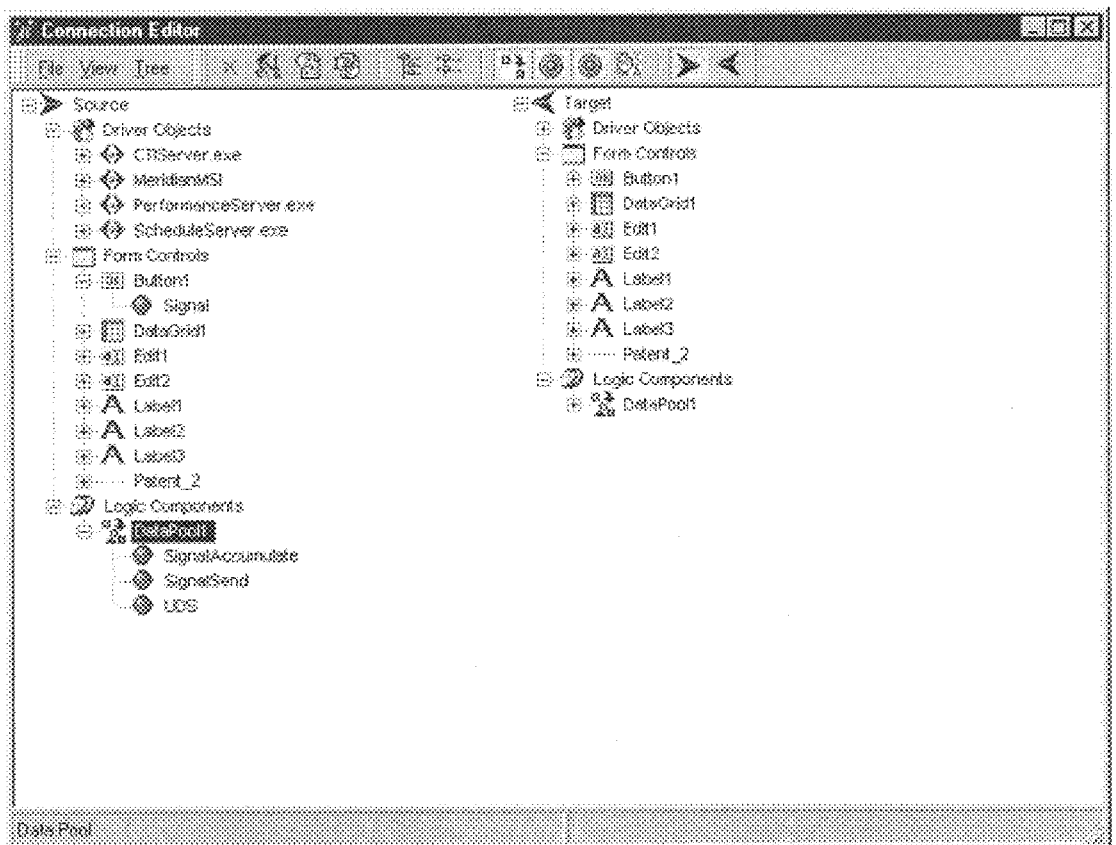
FIG. 13 depicts the connection editor of FIG. 5C implemented to add a datapool component.
Figure 14:
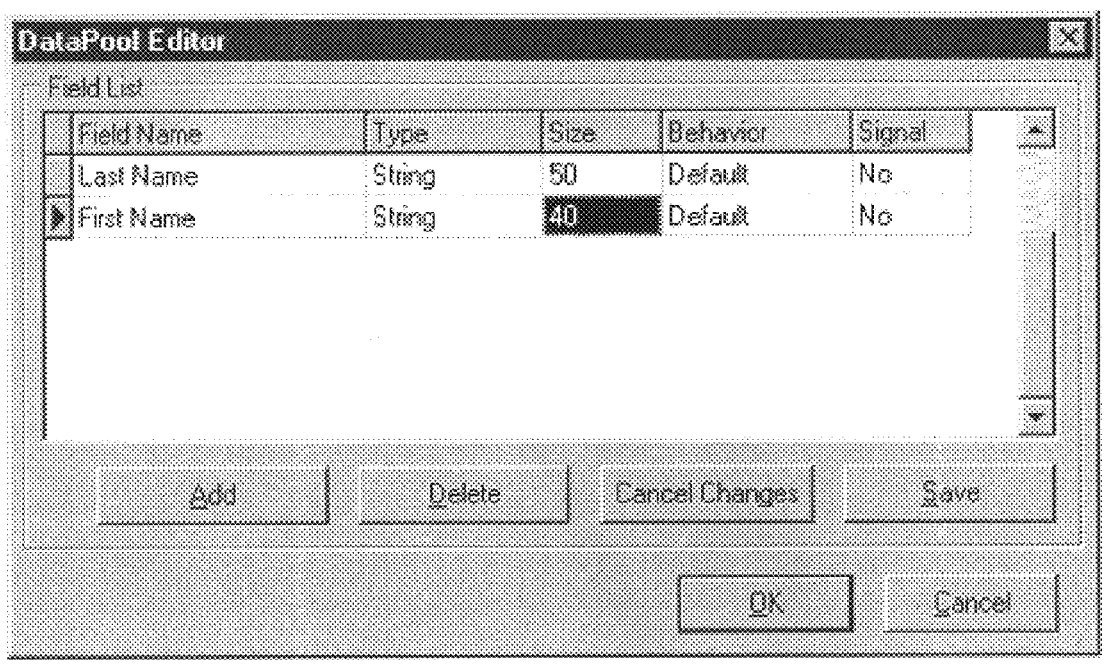
FIG. 14 depicts a datapool editor for defining field in the data to be combined, as selected in FIG. 13.
Figure 15:
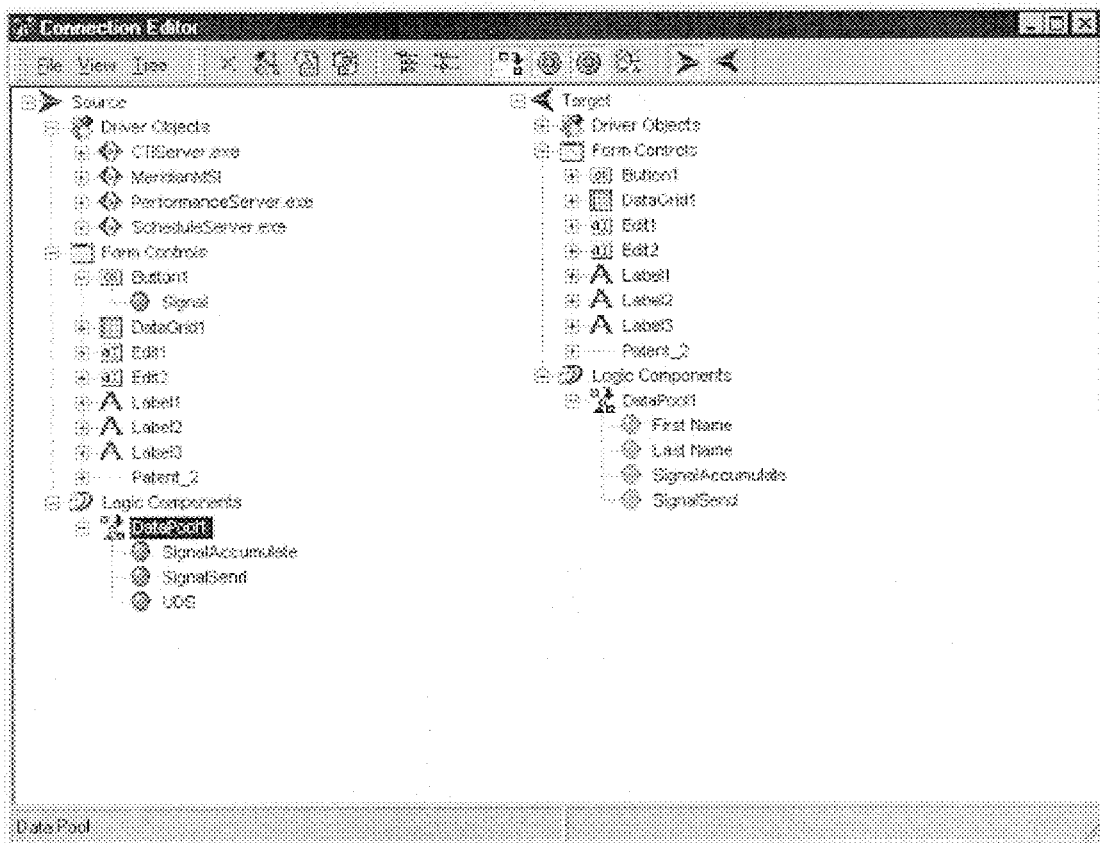
FIG. 15 depicts the connection editor of FIG. 5C with input data for a datapool component dynamically exposed.
Figure 16:
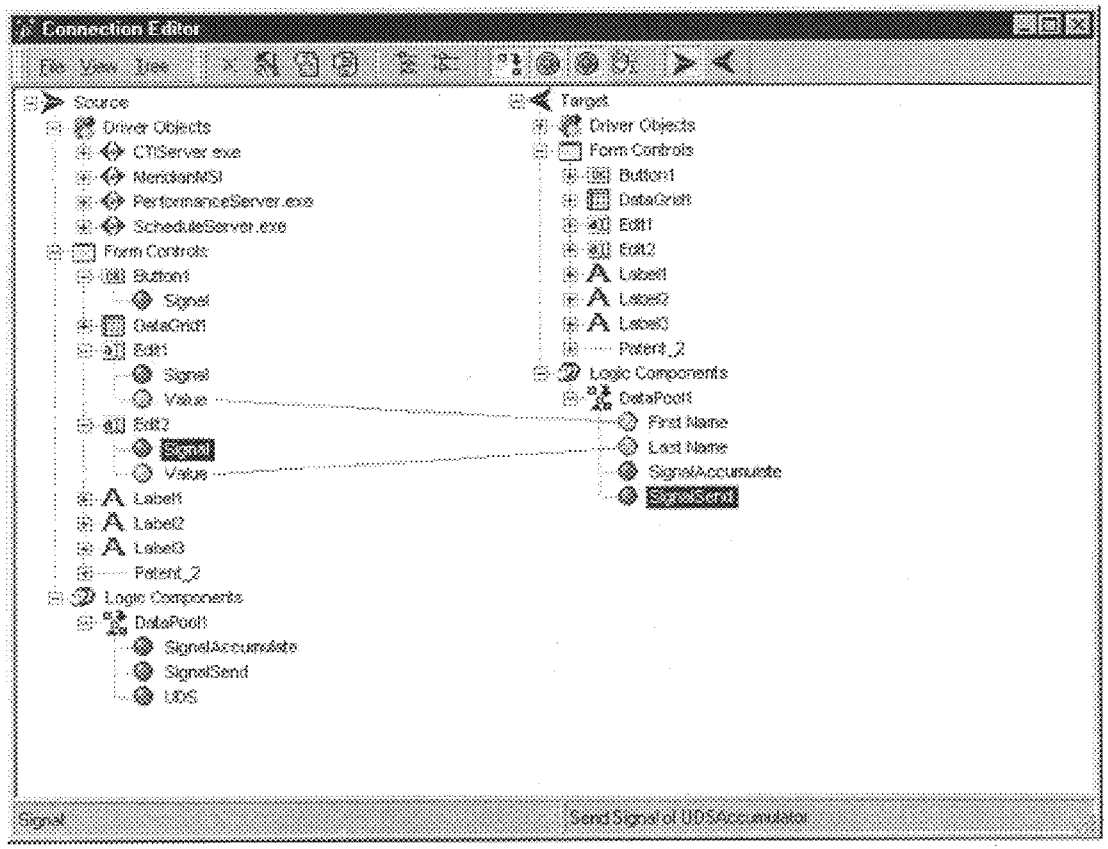
FIG. 16 depicts the connection editor of FIG. 5C with connections established between data input components to the datapool component.
Figure 17:
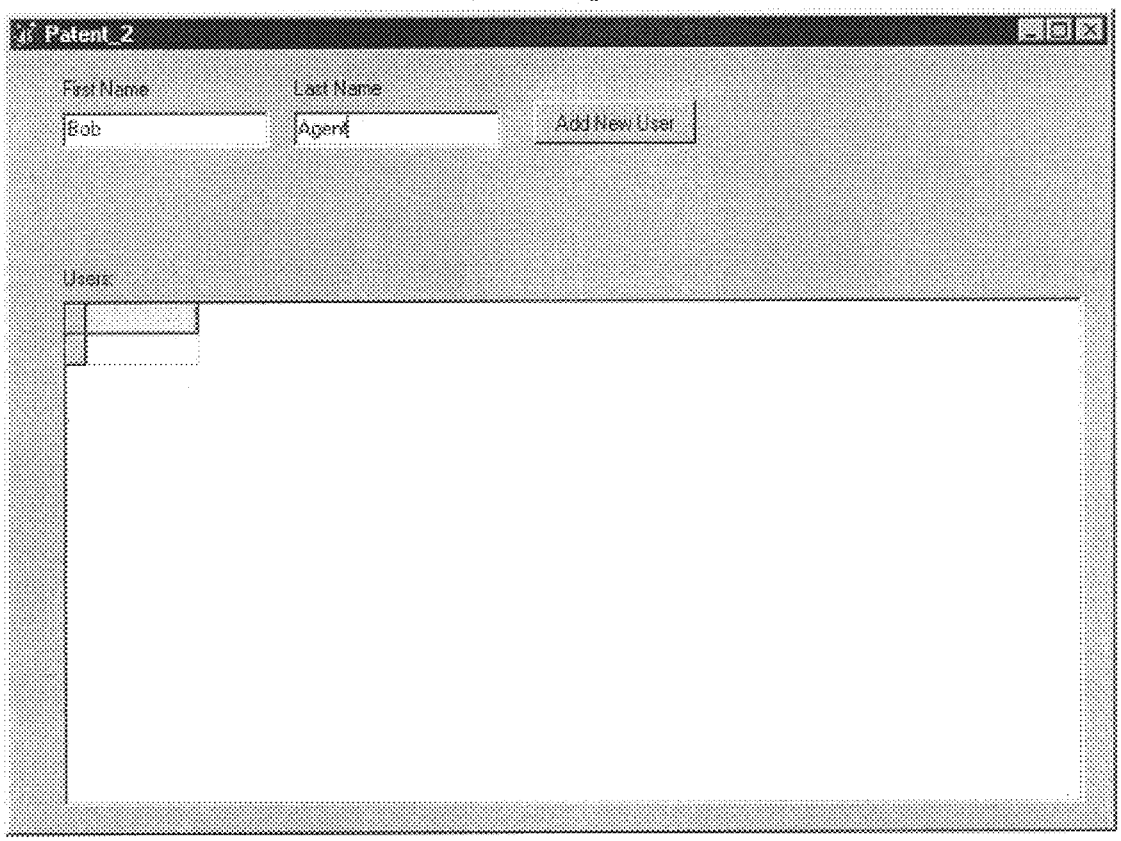
FIG. 17 depicts a screenshot for adding user data.
Figure 18:
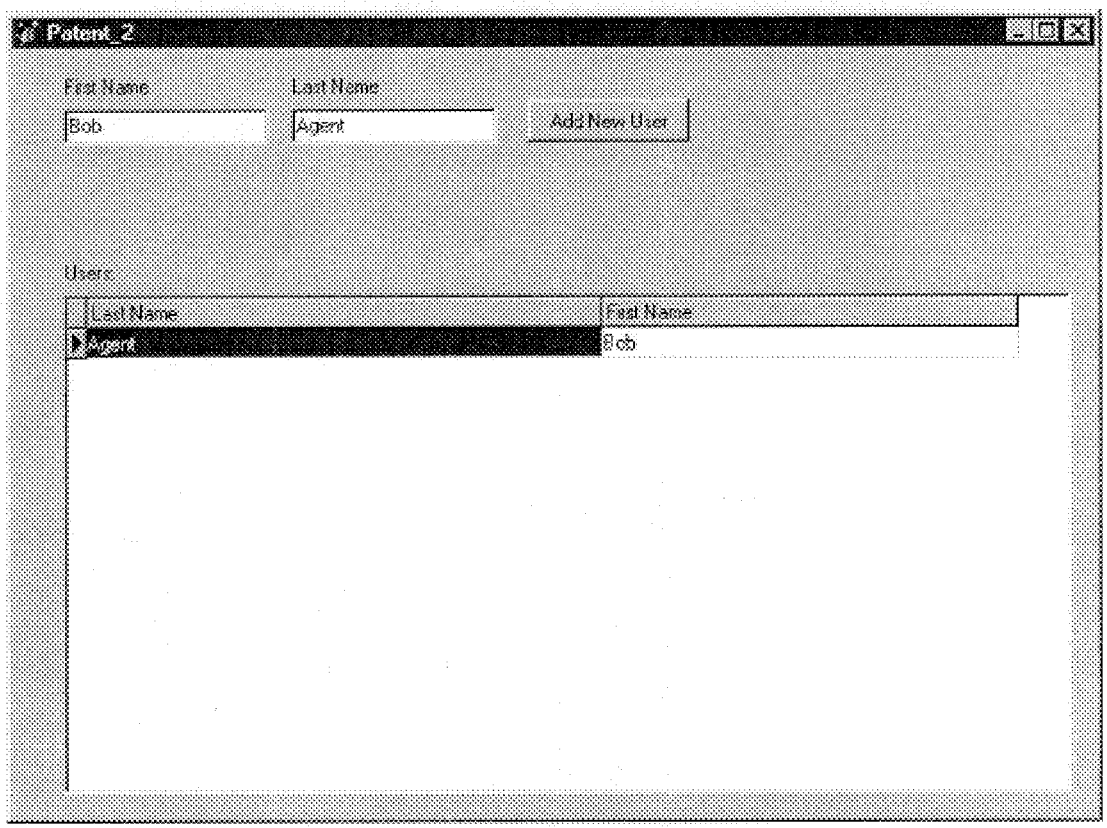
FIG. 18 depicts a screenshot showing data being moved into the data set that displayed by a datagrid component.

FIG. 7C shows Connection Editor 203 after using UDS Editor 710 as indicated above. The DataSet1 721 Interface Properties have been modified to include Interface Property "abncalls" 722, the column that was previously selected. The "abncalls" 722 Interface Property can now be utilized as any other interface property in the Connection Editor 720 to propagate the data into any compatible interface property of any component in the system.

The Data Set Component is a further example of how the Interface Manager 410, with its dynamic property capabilities, and the Connection Editor 203 embodiment can be used to provide the manipulation of data discovered at run-time and/or dynamically supplied by the application developer without the requirement of programming.

Upon completion, the developed application can be saved using the Application Designer Tool-Bar 201. Component streaming is utilized to stream all local programs, Visual Controls, External Program Drivers, and non-visual Logic Components, to a binary file. Because each program contains an internal implementation of the Interface Manager 410, the information about connections is also streamed. When applications are loaded for execution, the Interface Managers for each program utilize the saved connection data to re-establish connections between all program interfaces.

Thus, in the present invention, an application can be constructed from existing programs that have implemented the requisite Interface Manager technology. The user experiences unprecedented ease of use that makes building distributed-binary applications accessible by those without programming skills. However, the burden of making programs compatible with the Visual Development System remains on skilled programmers who must successfully complete the Interface Manager implementation before the program is available in the Visual Development System.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

Source code emboding the present invention can be found in Appendices A through F, and is hereby incorporated by reference.

What is claimed is:

1. A method in a computer system for automating data flow in a visual development configuration between disparate program interfaces without source code programming, comprising the steps of:

including an interface manager in each of a plurality of disparate computer programs;

implementing a connection editor to interact with said interface managers of said plurality of disparate computer programs;

utilizing said connection editor to connect selected said interface managers of said plurality of disparate computer programs to establish a plurality of real-time connections between said plurality of disparate computer programs creating automated data flow between said computer programs;

wherein said interface manager supports dynamic connection points to allow for the run-time discovery of data;

creating a data structure for each of the dynamic connection points, wherein the data structure includes simulation information of a static connection point interface property;

indexing a plurality of the data structures corresponding to the dynamic connection points by an identifier in the interface manager as available connection points;

exposing the available connection points to in the connection editor; and implementing the connection editor to recognize the available connection points, wherein the available connection points are implemented in the exchange of data during run time.

2. The method of claim 1, wherein the data corresponding to the dynamic connection points comprises fields in a protocol.

3. The method of claim 1, further comprising the step of:
implementing the interface manager as a component that creates an interface.

4. The method of claim 1, further comprising the step of:
classifying object meta-data corresponding to each the disparate computer program in the source program tree; and
classifying object meta-data corresponding to each the disparate computer program in the target program tree.

5. The method of claim 1, wherein the automating of data flow is executed by a computer.

6. A method in a computer system for automating data flow in a visual development configuration between disparate program interfaces without source code programming, comprising the steps of:

including an interface manager in each of a plurality of disparate computer programs;

implementing a connection editor to interact with said interface managers of said plurality of disparate computer programs;

utilizing said connection editor to connect selected said interface managers of said plurality of disparate computer programs to establish a plurality of real-time connections between said plurality of disparate computer programs creating automated data flow between said computer programs;

implementing a source program tree within the connection editor, wherein the disparate computer programs are grouped by type;

implementing a target program tree within the connection editor, wherein the disparate computer programs are grouped by type;

implementing the connection editor to query the interface manager associated with each the disparate computer program;

obtaining an interface ID from the interface manager, wherein the interface ID is an unique identifier for the disparate computer program; and receiving an interface reference denoting location of the interface manager for the disparate computer program.

7. The method of claim 6, wherein an interface manager is unavailable to the connection editor if the interface reference is nil (0).

8. The method of claim 6, wherein an interface manager is available to the connection editor if the interface reference is not nil (0).

9. The method of claim 6, further comprising the step of:
implementing a command to get a list of properties for the interface manager, wherein a data structure is returned containing the list of properties corresponding to the interface manager.

10. The method of claim 6, wherein the interface manager is added to the source tree if the connection editor determines that the interface manager includes a property capable of output.

11. The method of claim 6, wherein the interface manager is added to the target tree if the connection editor determines that the interface manager includes a property capable of input.

12. The method of claim 6, further comprising the step of:
determining whether a first interface manager under the target tree is compatible with a second interface manager under the source tree.

13. The method of claim 6, further comprising the step of:
classifying object meta-data corresponding to each the disparate computer program in the source program tree; and
classifying object meta-data corresponding to each the disparate computer program in the target program tree.

14. The method of claim 6, further comprising the step of:
implementing the interface manager as a component that creates an interface.

15. The method of claim 6, wherein the automating of data flow is executed by a computer.

16. A method in a computer system for automating data flow in a visual development configuration between disparate program interfaces without source code programming, comprising the steps of:

including an interface manager in each of a plurality of disparate computer programs;

implementing a connection editor to interact with said interface managers of said plurality of disparate computer programs;

utilizing said connection editor to connect selected said interface managers of said plurality of disparate computer programs to establish a plurality of real-time connections between said plurality of disparate computer programs creating automated data flow between said computer programs;

implementing a source program tree within the connection editor, wherein the dispaiate computer programs are grouped by type;

implementing a target program tree within the connection editor, wherein the disparate computer programs are grouped by type;

identifying a first interface manager associated with a first computer program located within the source tree;

identifying a second interface manager associated with second computer program located within the target tree, wherein the second interface manager possesses compatible properties with the first interface manager located within the source tree; and implementing a connection between the first and second interface managers so that data input to the first computer program to automatically and in real time propagated to the second computer program.

17. The method of claim 16, further comprising the step of:

simulating an internal presence to the memory of the connection editor for programs external to memory of the connection editor, wherein the external programs include remote servers, executable files, and file libraries.

18. The method of claim 16, further comprising the step of:

implementing the interface manager as a component that creates an interface.

19. The method of claim 16, wherein the automating of data flow is executed by a computer.

20. A system for automating data flow in a visual development configuration between disparate program interfaces without source code programming, comprising:

an interface manager in each of a plurality of disparate computer programs;

a connection editor to interact with said interface managers of said plurality of disparate computer programs; said connection editor utilized to connect selected said interface managers of said plurality of disparate computer programs to establish a plurality of real-time connections between said plurality of disparate computer programs creating automated data flow between said computer programs;

wherein said interface manager supports dynamic connection points to allow for the run-time discovery of data;

logic configured to create a data structure for each of said dynamic connection points, wherein said data structure includes simulation information of a static connection point interface property;

logic configured to index plurality of said data structures corresponding to said dynamic connection points by an identifier in said interface manager as available connection points, wherein said available connection points are exposed to in said connection editor; and logic configured to implement said connection editor to recognize said available connection points for exchange of data during run time.

21. The system of claim 20, further comprising:

a computer to execute the automating of data flow in a visual development configuration between disparate program interfaces without source code programming.

22. The system of claim 20, wherein the interface manager is a component that creates an interface.

23. A system for automating data flow in a visual development configuration between disparate program interfaces without source code programming, comprising:

an interface manager in each of a plurality of disparate computer programs;

a connection editor to interact with said interface managers of said plurality of disparate computer programs; said connection editor utilized to connect selected said interface managers of said plurality of disparate computer programs to establish a plurality of real-time connections between said plurality of disparate computer programs creating automated data flow between said computer programs;

a source program tree configured in said connection editor, wherein said disparate computer programs are grouped by type;

a target program tree configured in said connection editor, wherein said disparate computer programs are grouped by type;

logic configured to implement said connection editor to query said interface manager associated with each said disparate computer program;

logic configured to obtain an interface ID from said interface manager, wherein said interface ID is an unique identifier for said disparate computer program; and logic configured to receive an interface reference denoting location of said interface manager for said disparate computer program.

24. The system of claim 23, wherein said interface manager is unavailable to said connection editor if said interface reference is nil (0).

25. The system of claim 33, wherein said interface manager is available to said connection editor if said interface reference is not nil (0).

26. The system of claim 23, further comprising:

logic configured to get a list of properties for said interface manager, wherein a data structure is returned containing said list of properties corresponding to said interface manager.

27. The system of claim 23, wherein said interface manager is added to said source tree if said connection editor determines that said interface manager includes a property capable of output.

28. The system of claim 23, wherein said interface manager is added to said target tree if said connection editor determines that said interface manager includes a property capable of input.

29. The system of claim 23, further comprising:

logic configured to determine whether a first interface manager under said target tree is compatible with a second interface manager under said source tree.

30. The system of claim 23, wherein the interface manager is a component that creates an interface.

31. The system of claim 23, further comprising:

a computer to execute the automating of data flow in a visual development configuration between disparate program interfaces without source code programming.

32. A system for automating data flow in a visual development configuration between disparate program interfaces without source code programming, comprising:

an interface manager in each of a plurality of disparate computer programs;

a connection editor to interact with said interface managers of said plurality of disparate computer programs; said connection editor utilized to connect selected said interface managers of said plurality of disparate computer programs to establish a plurality of real-time connections between said plurality of disparate computer programs creating automated data flow between said computer programs;

a source program tree configured in said connection editor, wherein said disparate computer programs are grouped by type;

a target program tree configured in said connection editor, wherein said disparate computer programs are grouped by type;

logic configured to identify a first interface manager associated with a first computer program located within said source tree;

logic configured to identify a second interface manager associated with second computer program located within said target tree, wherein said second interface manager possesses compatible properties with said first interface manager located within said source tree; and logic configured to connect said first and second interface managers so that data input to said first computer program to automatically and in real time propagated to said second computer program.

33. The system of claim 32, further comprising:

logic configured to simulate an internal presence to memory of said connection editor for programs external to memory of said connection editor, wherein types of external programs include remote servers, executable files, and file libraries.

34. The system of claim 32, wherein the interface manager is a component that creates an interface.

35. The system of claim 32, further comprising:

a computer to execute the automating of data flow in a visual development configuration between disparate program interfaces without source code programming.

* * * * *